United States Patent
Christie et al.

(10) Patent No.: US 6,349,100 B1
(45) Date of Patent: *Feb. 19, 2002

(54) SYSTEM AND METHOD FOR PROVIDING ENHANCED SERVICES FOR A TELECOMMUNICATION CALL

(75) Inventors: Joseph Michael Christie, deceased, late of San Bruno, CA (US), by Joseph S. Christie, Jean M. Christie, legal representatives; Tracy Lee Nelson, Shawnee Mission, KS (US)

(73) Assignee: Sprint Communications Company, L. P., Kansas City, MO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/272,698

(22) Filed: Mar. 18, 1999

(Under 37 CFR 1.47)

Related U.S. Application Data

(63) Continuation of application No. 08/754,847, filed on Nov. 22, 1996, now Pat. No. 5,920,562, and a continuation-in-part of application No. 08/525,897, filed on Sep. 8, 1995, now Pat. No. 5,991,301, which is a continuation-in-part of application No. 08/568,551, filed on Dec. 7, 1995, now Pat. No. 5,825,780, which is a continuation of application No. 08/238,605, filed on May 5, 1994, now abandoned, and a continuation-in-part of application No. 08/525,050, filed on Sep. 8, 1995, which is a continuation-in-part of application No. 08/568,551, which is a continuation of application No. 08/238,605.

(51) Int. Cl.[7] .......................... H04L 12/28; H04L 12/56
(52) U.S. Cl. ........................................ 370/401; 370/400
(58) Field of Search ................................ 370/401, 298, 370/354, 356, 358, 360, 377, 384, 392, 395, 396, 400, 420, 422, 442, 466, 467, 498, 351, 355, 359; 379/67.1, 87, 88.01, 88.07, 88.08, 88.12, 88.18, 88.2, 229, 231, 266

(56) References Cited

U.S. PATENT DOCUMENTS

4,720,850 A    1/1988   Oberlander et al.

(List continued on next page.)

FOREIGN PATENT DOCUMENTS

JP          45-38569        12/1970

(List continued on next page.)

OTHER PUBLICATIONS

U.S. application No. 08/525,050, Sep. 8, 1995.

(List continued on next page.)

*Primary Examiner*—Douglas W. Olms
*Assistant Examiner*—Phirin Sam
(74) *Attorney, Agent, or Firm*—Harley R. Ball

(57) ABSTRACT

A system and method provide enhanced services for a call that is transported from a communication device through an asynchronous transfer mode system. The call has user communications in asynchronous transfer mode cells and call signaling. A signaling processor receives the call signaling and processes the call signaling to determine a connection to a service platform. The signaling processor transports a processor control message designating the selected connection. An asynchronous transfer mode interworking unit receives the user communications from the communication device and the processor control message from the signaling processor. The asynchronous transfer mode interworking unit converts the user communications from the asynchronous transfer mode cells to a format compatible with the service platform and dynamically transports the user communications to the service platform in real time. The service platform processes the user communications. The reverse process can also take place with the dynamic transfer, in real time, of the processed user communications back to the communication device in asynchronous transfer mode cells that identify the connection to the communication device.

30 Claims, 14 Drawing Sheets

U.S. PATENT DOCUMENTS

| | | |
|---|---|---|
| 4,763,317 A | 8/1988 | Lehman et al. |
| 5,051,983 A | 9/1991 | Kammerl |
| 5,073,890 A | 12/1991 | Danielsen |
| 5,193,110 A | 3/1993 | Jones et al. |
| 5,204,857 A | 4/1993 | Obara |
| 5,218,602 A | 6/1993 | Grant et al. |
| 5,251,255 A | 10/1993 | Epley |
| 5,345,445 A | 9/1994 | Hiller et al. |
| 5,367,566 A | 11/1994 | Moe et al. |
| 5,392,402 A | 2/1995 | Robrock, II |
| 5,420,916 A | 5/1995 | Sekiguchi |
| 5,426,636 A | 6/1995 | Hiller et al. |
| 5,434,852 A | 7/1995 | La Porta et al. |
| 5,440,563 A | 8/1995 | Isidoro et al. |
| 5,459,722 A | 10/1995 | Sherif |
| 5,461,669 A | 10/1995 | Vilain |
| 5,473,677 A | 12/1995 | D'Amato et al. |
| 5,473,679 A | 12/1995 | La Porta et al. |
| 5,483,527 A | 1/1996 | Doshi et al. |
| 5,497,373 A | 3/1996 | Hulen et al. |
| 5,499,290 A | 3/1996 | Koster |
| 5,513,355 A | 4/1996 | Doellinger et al. |
| 5,519,707 A | 5/1996 | Subramanian et al. |
| 5,539,884 A | 7/1996 | Robrock, II |
| 5,550,820 A | 8/1996 | Baran |
| 5,563,939 A | 10/1996 | La Porta et al. |
| 5,572,583 A * | 11/1996 | Wheeler, Jr. et al. ........ 379/207 |
| 5,587,999 A | 12/1996 | Endo |
| 5,594,723 A | 1/1997 | Tibi |
| 5,608,447 A | 3/1997 | Farry et al. |
| 5,623,493 A | 4/1997 | Kagemoto |
| 5,673,262 A | 9/1997 | Shimizu |
| 5,680,390 A | 10/1997 | Robrok, II |
| 5,710,769 A | 1/1998 | Anderson et al. |
| 5,745,553 A | 4/1998 | Mirville |
| 5,771,234 A | 6/1998 | Wu et al. |
| 5,787,086 A | 7/1998 | McClure et al. |
| 5,793,845 A | 8/1998 | Hollywood et al. |
| 5,802,045 A | 9/1998 | Kos |
| 5,825,780 A | 10/1998 | Christie |
| 5,835,584 A | 11/1998 | Penttonen |
| 5,867,562 A * | 2/1999 | Scherer ................ 379/88.21 |
| 5,889,848 A * | 3/1999 | Cookson .................. 379/230 |
| 5,920,562 A | 7/1999 | Christie et al. |
| 5,940,393 A * | 8/1999 | Duree et al. ............... 370/392 |
| 5,940,487 A * | 8/1999 | Dunch et al. .............. 379/201 |
| 5,991,301 A | 11/1999 | Christie |
| 6,005,845 A * | 12/1999 | Svennesson et al. ........ 370/260 |
| 6,016,343 A | 1/2000 | Hogan et al. |
| 6,031,840 A | 2/2000 | Christie et al. |
| 6,061,364 A | 5/2000 | Hager et al. |
| 6,072,798 A | 6/2000 | Beasley |

FOREIGN PATENT DOCUMENTS

| | | |
|---|---|---|
| JP | 60-169318 | 9/1985 |
| WO | WO 95/31057 | 11/1995 |

OTHER PUBLICATIONS

U.S. application No. 08/754,847, Nov. 22, 1996.

U.S. application No. 09/272,655, Mar. 18, 1999.

U.S. application No. 09/272,932, Mar. 18, 1999.

ITU–T, "Visual Telephone Systems and Equipment for Local Area Networks Which Provide A Non–Guaranteed Quality of Service," ITU–T Recommendation, (May 28, 1996).*

Bjoern Christensen, "Tutorial: Integration of Fixed and Mobile Networks," IEEE Siemens AG, IEEE, (Feb. 2, 1996).*

Bjoern E. Christensen, Tutorial: Integration of Fixed and Mobile Netoworks, IEEE, 1996 pp. 1–19, Melbourne.

Barry T. Dingle, ISDN Signalling Control Part (ISCP), Australian Broadband Switching and Services Symposium, 1992, pp. 333–340, vol. 2 Melbourne.

Rob Palmer, An Experimental ATM Network for B–ISDN Research, IEEE Region 10 Conference 1992, Melbourne.

ITU–T, Line Transmission of Non–Telephone Signals "Visual Telephone Systems and Equipment for Local Area Networks Which Provide a Non–Guaranteed Quality of Service" H.323 May 28, 1996, pp. 1–75.

S. L. Sutherland, Broadband ISDN Interworking, Australian Broadband Switching and Services Symposium, Jul. 1992, pp. 405–412 vol. 2, Melbourne.

David Giddy et al., "An Experimental ATM Network Featuring De–Coupled Modular Control," Telecom Australia Research Laboratories (Victoria), pp. 118–122, (Nov. 1992).

The ATM Forum Technical Committee, "Voice and Telephony Over ATM to the Desktop Specification," AF–VTOA–0083.001, The ATM Forum (Mountain View, CA), pp. 1–50, (Feb. 1999).

Thomas F. La Porta, "Distributed Call Processing for Wireless Mobile Networks," Bell Labs Technical Journal, vol. 1 (No. 1), pp. 127–142, (Oct. 1996).

Surinder K. Jain, "Evolving Existing Narrowband Networks Towards Broadband Networks with IN Capabilities, " IEEE, (Jan. 1996).

V. Carmagnola, "An Integrated IN/B–ISDN Reference Architecture for the support of Multimedia Services, " IEEE, (Jan. 1996).

Yukio Kawanami, "IN Platform for DAVIC Video On Demand Service," IEEE, (Jan. 1996).

George E. Fry et al., "Next Generation Wireless Networks," Bell Labs Technical Journal, vol. 1 (No. 1), pp. 88–96, (1996).

Bengt Svantesson Ahmed Hemani, "A Novel Allocation Strategy for Control and Memory Intensive Telecommunication Circuits," IEEE, pp. 23–28, (Jan. 1996).

Principles of Intelligent Network Architecture, I.312/Q.1201 Integrated Services Digital Network (ISDN)I.312, CCITT (Oct. 1992).

Broadband Aspects of ISDN, I.121 Integrated Services Digital Network (ISDN) CCITT (1991).

Framework for Recommendations For Audiovisual Services, H.200 Line Transmission of Non–Telephone Signals ITU–T (Mar. 1993).

B–ISDN general network aspects, I.311 Series I: Integrated Services Digital Network ITU–T (Aug. 1996).

* cited by examiner

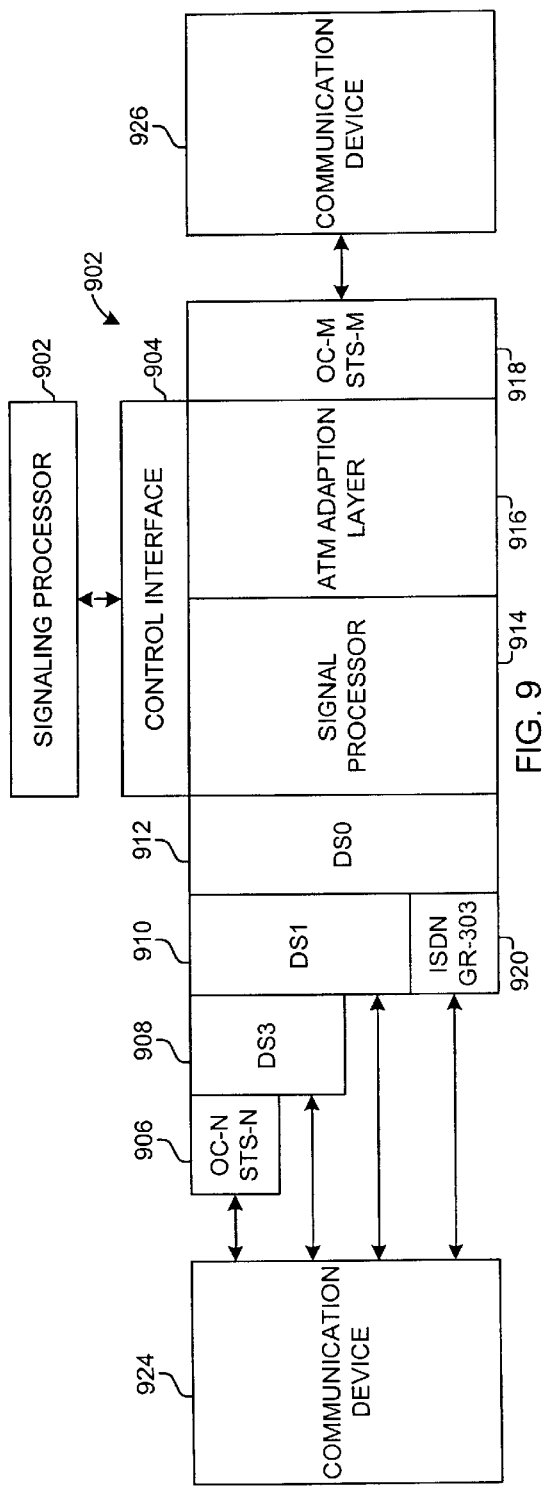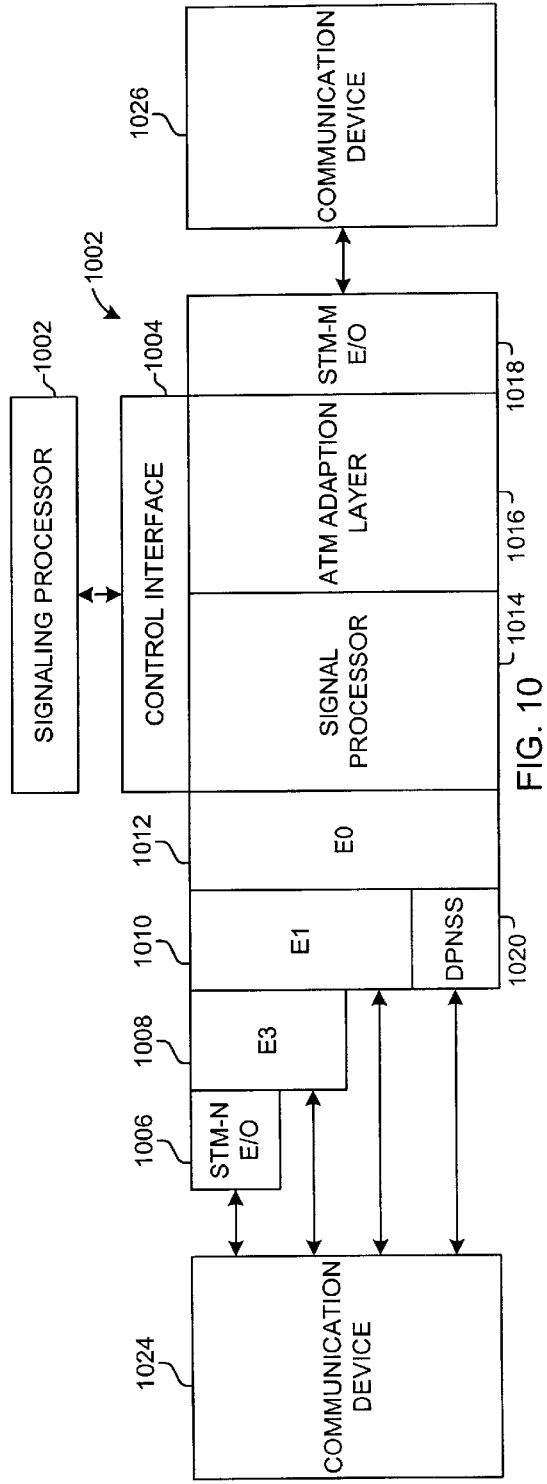

| ASSOCIATED POINT CODE | CIC | VP | VC | TRUNK GROUP NUMBER | GROUP MEMBER NUMBER | HARDWARE IDENTIFIER | ECHO CANCELER | ECHO CONTROL | SATELLITE INDICATOR | CIRCUIT STATUS | CIRCUIT STATE | TIME/ DATE |
|---|---|---|---|---|---|---|---|---|---|---|---|---|
| | | | | | | | | | | | | |
| | | | | | | | | | | | | |
| | | | | | | | | | | | | |

FIG. 14

| TRUNK GROUP NUMBER | GLARE RESOLUTION | CONTINUITY CONTROL | CLLI | SATELLITE TRUNK GROUP | SERVICE INDICATOR | ASSOCIATED NPA | SELECTION SEQUENCE | HOP COUNTER | ACC ACTIVE | OMI | NEXT FUNCTION | INDEX |
|---|---|---|---|---|---|---|---|---|---|---|---|---|
| | | | | | | | | | | | | |
| | | | | | | | | | | | | |
| | | | | | | | | | | | | |

FIG. 15

| EXCEPTION TABLE INDEX | CARRIER SELECTION IDENTIFICATION | CARRIER IDENTIFICATION | CALLED PARTY | | | NEXT FUNCTION | INDEX |
|---|---|---|---|---|---|---|---|
| | | | NATURE OF ADDRESS | DIGITS FROM | DIGITS TO | | |
| | | | | | | | |
| | | | | | | | |
| | | | | | | | |

| ANI TABLE INDEX | CALLING PARTY/CHARGE NUMBER ||||| NEXT FUNCTION | NEXT INDEX |
|---|---|---|---|---|---|---|---|
| | CALLING PARTY CATEGORY | NATURE OF ADDRESS | DIGITS FROM | DIGITS TO | ORIGINATING LINE INFORMATION DATA | | |
| | | | | | | | |
| | | | | | | | |

FIG. 18

| CALLED NUMBER TABLE INDEX | NATURE OF ADDRESS | DIGITS FROM | DIGITS TO | NEXT FUNCTION | NEXT INDEX |
|---|---|---|---|---|---|
| | | | | | |
| | | | | | |

FIG. 19

| ROUTING TABLE INDEX | TRANSIT NETWORK SELECTION |||| CIRCUIT CODE | NEXT FUNCTION #1 | INDEX #1 | NEXT FUNCTION #2 | INDEX #2 | NEXT FUNCTION #3 | INDEX #3 |
|---|---|---|---|---|---|---|---|---|---|---|---|
| | NETWORK IDENTIFICATION PLAN | DIGITS FROM | DIGITS TO | | | | | | | | |
| | | | | | | | | | | | |
| | | | | | | | | | | | |

FIG. 20

| INDEX | MESSAGE RECEIVED CAUSE VALUE | GENERAL LOCATION | CODING STANDARD | CAUSE VALUE | NEXT FUNCTION | INDEX |
|---|---|---|---|---|---|---|
| | | | | | | |
| | | | | | | |

| MESSAGE TYPE | PARAMETERS | INDEX #1 | INDEX #.... | INDEX #N |
|---|---|---|---|---|
| ADDRESS COMPLETE | BACKWARD CALL INDICATOR | | | |
| | ACCESS TRANSPORT | | | |
| | CAUSE INDICATOR | | | |
| | OPTIONAL BACKWARD CALL INDICATORS | | | |
| | OPTIONAL "FE" INDICATOR | | | |
| ANSWER | ACCESS TRANSPORT | | | |
| | BACKWARD CALL INDICATOR | | | |
| CALL PROGRESS | EVENT INFORMATION | | | |
| | BACKWARD CALL INDICATOR | | | |
| | ACCESS TRANSPORT | | | |
| | CAUSE INDICATOR | | | |
| | OPTIONAL BACKWARD CALL INDICATOR | | | |
| CIRCUIT RESERVATION | NATURE OF CONNECTION INDICATOR | | | |
| CIRCUIT RESERVATION ACK | N/A | | | |
| CONFUSION | N/A | | | |
| CONTINUITY | CONTINUITY INDICATOR | | | |
| EXIT | OUTGOING TRUNK GROUP NUMBER | | | |
| INFORMATION | ALL PARAMETERS | | | |
| INFORMATION REQUEST | ALL PARAMETERS | | | |
| INITIAL ADDRESS | NATURE OF CONNECTION INDICATOR | | | |
| | FORWARD CALL INDICATOR | | | |
| | CALLING PARTY'S CATEGORY | | | |
| | USER SERVICE INFORMATION | | | |
| | CALLED PARTY NUMBER | | | |
| | ACCESS TRANSPORT | | | |
| | CALLING PARTY NUMBER | | | |
| | CARRIER IDENTIFICATION | | | |
| | CARRIER SELECTION INFORMATION | | | |
| | CHARGE NUMBER | | | |
| | GENERIC ADDRESS | | | |
| | ORIGINATING LINE INFORMATION | | | |
| | ORIGINAL CALLED NUMBER | | | |
| | REDIRECTING NUMBER | | | |
| | SERVICE CODE | | | |
| | TRANSIT NETWORK SELECTION | | | |
| | HOP COUNTER | | | |
| PASS ALONG | ALL PARAMETERS | | | |
| RELEASE | CAUSE INDICATOR | | | |
| | ACCESS TRANSPORT | | | |
| | AUTOMATIC CONGESTION CONTROL | | | |
| RELEASE COMPLETE | N/A | | | |
| RESUME | SUSPEND/RESUME INDICATOR | | | |
| SUSPEND | SUSPEND/RESUME INDICATOR | | | |

FIG. 21

SYSTEM AND METHOD FOR PROVIDING ENHANCED SERVICES FOR A TELECOMMUNICATION CALL

RELATED APPLICATIONS

This application is a continuation of prior application Ser. No. 08/754,847, filed Nov. 22, 1996 now U.S. Pat. No. 5,920,562, and entitled "SYSTEM AND METHOD FOR PROVIDING ENHANCED SERVICES FOR A TELECOMMUNICATION CALL", and which is incorporated by reference into this application.

This application is also a continuation-in-part of prior U.S. Pat. No. 5,991,301, filed on Sept. 8, 1995, entitled "BROADBAND TELECOMMUNICATIONS SYSTEM," which is hereby incorporated by reference into this application, and which is a continuation-in-part of prior U.S. Pat. No. 5,825,780, filed on Dec. 7, 1995, entitled "METHOD, SYSTEM AND APPARATUS FOR TELECOMMUNICATIONS CONTROL," which is hereby incorporated by reference into this application, and which is a continuation of prior abandoned U.S. Pat. application No. 08/238,605, filed on May 5, 1994, entitled "METHOD, SYSTEM AND APPARATUS FOR TELECOMMUNICATIONS CONTROL," which is hereby incorporated by reference into this application.

This application is also a continuation-in-part of prior U.S. Pat. application No. 08/525,050, filed on Sept. 8, 1995, entitled "SYSTEM FOR MANAGING TELECOMMUNICATIONS," which is hereby incorporated by reference into this application, and which is a continuation-in-part of prior U.S. Pat. No. 5,825,780, filed on Dec. 7, 1995, entitled "METHOD, SYSTEM AND APPARATUS FOR TELECOMMUNICATIONS CONTROL," which is hereby incorporated by reference into this application, and which is a continuation of prior abandoned U.S. Pat. application No. 08/238,605, filed on May 5, 1994, entitled "METHOD, SYSTEM AND APARATUS FOR TELECOMMUNICATIONS CONTROL," which is hereby incorporated by reference into this application.

FEDERALLY SPONSERED RESEARCH OR DEVELOPMENT

Not applicable

MICROFICHE APPENDIX

Not applicable

FIELD OF THE INVENTION

The present invention relates to the field of telecommunications transmission and processing.

SUMMARY OF THE INVENTION

The present invention comprises a system for providing services for a call from a first communication device in an asynchronous transfer mode format. The call has user communications and call signaling. The system comprises a service platform adapted to receive the user communications. The service platform applies an interactive application to the user communications to process the user communications. The system further comprises a signaling processor adapted to receive the call signaling from the first communication device and to process the call signaling to select a first connection to the service platform. The signaling processor transports a processor control message designating the selected first connection. The system also comprises an interworking unit adapted to receive the processor control message from the signaling processor and to receive the user communications from the first communication device. The interworking unit converts the user communications from the asynchronous transfer mode format to a format usable by the service platform and uses the processor control message to transport the converted user communications to the service platform.

Further, the present invention is a system for providing services for a call from a first communication device in a time division multiplex format. The call has user communications and call signaling. The system comprises a service platform adapted to receive the user communications in an asynchronous transfer mode format. The service platform applies an interactive application to the user communications to process the user communications. The system further comprises a signaling processor adapted to receive the call signaling from the first communication device and to process the call signaling to select a first connection to the service platform. The signaling processor transports a processor control message designating the selected first connection. The system further comprises an interworking unit adapted to receive the processor control message from the signaling processor and to receive the user communications from the first communication device. The interworking unit interworks the user communications from the time division multiplex format to asynchronous transfer mode formatted cells that identify the selected first connection to the service platform.

In another aspect, the present invention is a method for connecting a call from a first communication device through an asynchronous transfer mode system. The call has user communications and call signaling. The method comprises receiving the call signaling in a signaling processor. The call signaling is processed to select a selected first one of a plurality of connections to a service platform for the user communications. A processor control message is transported from the signaling processor designating the selected first connection. The method further comprises receiving the user communications and the processor control message in an interworking unit. The user communications are converted in the interworking unit from the asynchronous transfer mode format to a format that is compatible with the service platform in response to the processor control message and transported from the interworking unit over the selected first connection to the service platform. The user communications are received in the service platform and processing the user communications.

In yet another aspect, the present invention is a method for connecting a call from a first communication device in a time division multiplex format. The call has user communications and call signaling. The method comprises receiving the call signaling in a signaling processor and processing the call signaling to select a selected first one of a plurality of connections to a service platform for the user communications. The processor control message is transported from the signaling processor designating the selected first connection. The user communications and the processor control message are received in an interworking unit. The method further comprises converting the user communications in the interworking unit from the time division multiplex format to asynchronous transfer mode formatted cells that identify the selected first connection to the service platform and transporting the converted user communications from the interworking unit over the selected first connection to the service platform. The user communications are received in the service platform and processing the user communications.

In still another aspect, the present invention is a system for connecting a call in an asynchronous transfer mode system. The call has user communications and call signaling. The system comprises a first communication device adapted to transport the call, a service node adapted to process the user communications, and a signaling processor adapted to receive the call signaling and to process the call signaling to select a connection to the service node. The signaling processor transports a processor control message designating the selected connection. The system also comprises an interworking unit located in the asynchronous transfer mode system adapted to receive the user communications from the first communication device, to receive the processor control message from the signaling processor, and to use the processor control message to route the user communications to the service node over the selected connection.

Still further, the present invention is a method for connecting a call through an asynchronous transfer mode system to a service node. The call has user communications and call signaling. The method comprises transporting the call from a communication device, the user communications comprising asynchronous transfer mode cells. The method includes receiving the call signaling in a signaling processor and processing the call signaling to select one of a plurality of connections to the service node. A processor control message is transported from the signaling processor designating the selected connection. The user communications and the processor control message are received in an interworking unit. The method further comprises converting the user communications from the asynchronous transfer mode cells to a format usable by the service node and using the processor control message to route the user communications to the service node over the selected connection and processing the user communications in the service node.

The present invention further comprises a method for connecting a call having user communications through an asynchronous transfer mode system. The method comprises selecting in a processor a selected one of a plurality of connections to a service platform for the user communications. An interworking unit is notified which one of the plurality of connections was selected. The user communications are received in the interworking unit. The user communications are converted in the interworking unit from the asynchronous transfer mode format to a format that is compatible with the service platform. The converted user communications are transported in real time from the interworking unit over the selected connection to the service platform.

DESCRIPTION OF THE DRAWINGS

FIG. 9 is a functional diagram of an asynchronous transfer mode interworking multiplexer for use with a synchronous optical network system in accordance with the present invention.

FIG. 10 is a functional diagram of an asynchronous transfer mode interworking multiplexer for use with a synchronous digital hierarchy system in accordance with the present invention.

FIG. 14 is a table diagram of a trunk circuit table used in the signaling processor of FIG. 13.

FIG. 15 is a table diagram of a trunk group table used in the signaling processor of FIG. 13.

FIG. 16 is a table diagram of an exception circuit table used in the signaling processor of FIG. 13.

FIG. 17 is a table diagram of an automated number index table used in the signaling processor of FIG. 13.

FIG. 18 is a table diagram of a called number table used in the signaling processor of FIG. 13.

FIG. 19 is a table diagram of a routing table used in the signaling processor of FIG. 13.

FIG. 20 is a table diagram of a treatment table used in the signaling processor of FIG. 13.

FIG. 21 is a table diagram of a message table used in the signaling processor of FIG. 13.

DETAILED DESCRIPTION OF THE PREFERRED EMBODIMENT

Figure 1:
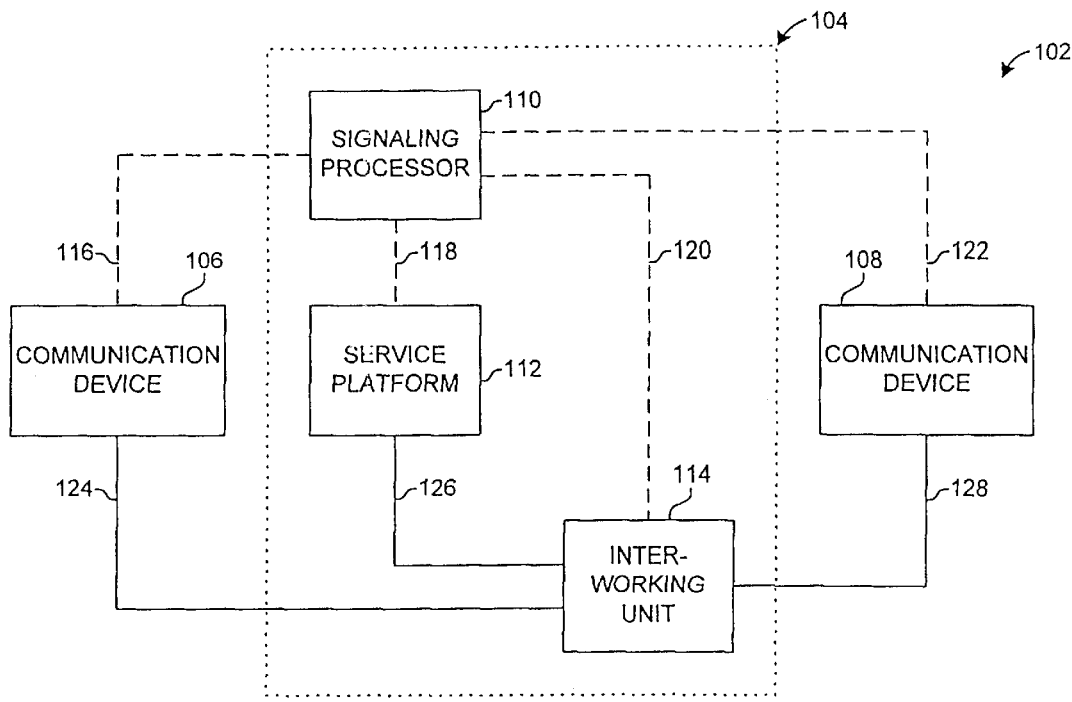
FIG. 1 is a block diagram of a service platform system in accordance with the present invention.

A call is a request for telecommunication services. Telecommunication systems provide services and processing for telecommunication calls between communication devices. Each call has call signaling and user communications. The user communications contain the caller's information, such as a voice communication or data communication, and they are communicated over a connection. Call signaling contains information that facilitates call processing, and it is communicated over a link. Call signaling, for example, contains information describing the called number and the calling number. Examples of call signaling are standardized signaling, such as SS7, C7, integrated services data network (ISDN), and digital private network signaling system (DPNSS).

A call can be transmitted from a communication device. A communication device can be, for example, customer premises equipment, a call processing platform, a switch, or any other device capable of initiating, handling, or terminating a call. Customer premises equipment can be, for example, a telephone, a computer, a facsimile machine, or a private branch exchange. A call processing platform can be, for example, a service platform or any other enhanced platform that is capable of processing calls.

The user communications and the call signaling may be transported by a communication device through an in-band transmission, such as superframe (SF) or extended superframe (ESF), over a time division multiplex (TDM) carrier such as a digital signal (DS) level communication line. Digital signal level zero (DS0), digital signal level one (DS1), and digital signal level three (DS3) are common designations that carry in-band communications. Other equivalent designations also carry in-band traffic. For example, European communication systems such as European level one (E1), European level 2 (E2), European level 3 (E3), and European level four (E4) are common designations that carry in-band communications.

In addition, call signaling and user communications may be transported out-of-band on separate transport paths, separate transport channels, separate transport connections, or separate transport media. These transports may be carried over DS level or equivalent European level media, as well as higher speed optical and electrical systems, such as synchronous optical network (SONET) and synchronous digital hierarchy (SDH). For example, signaling system 7 (SS7) and the European equivalent, C7, transport signaling traffic out-of-band. Moreover, narrowband systems such as ISDN and broadband systems such as broadband integrated services data network (B-ISDN), including B-ISDN over asynchronous transfer mode (ATM), transport call signaling and user communications out-of-band.

Broadband systems provide greater bandwidth than narrowband systems for calls, in addition to providing digital processing of the calls, error checking, and correction. ATM is one technology that is being used in conjunction with SONET and SDH to provide broadband call switching and call transport for telecommunication services.

ATM is a protocol that describes communication of user communications in ATM cells. Because the protocol uses cells, calls can be transported on demand for connection-oriented traffic, connectionless-oriented traffic, constant-bit traffic, variable-bit traffic including bursty traffic, and between equipment that either requires timing or does not require timing.

ATM systems handle calls over switched virtual paths (SVPs) and switched virtual circuits (SVCs). The virtual nature of ATM allows multiple communication devices to use a physical communication line at different times. This type of virtual connection more efficiently uses bandwidth, and thereby provides more cost efficient transport for customer calls, than permanent virtual circuits (PVCs) or other dedicated circuits.

The ATM system is able to connect a caller from an origination point to a destination point by selecting a connection from the origination point to the destination point. The connection contains a virtual path (VP) and a virtual channel (VC). A VC is a logical connection between two end points for the transfer of ATM cells. A VP is a logical combination of VCs. The ATM system designates the selected connection by specifying a virtual path identifier (VPI) that identifies the selected VP and a virtual channel identifier (VCI) that identifies the selected VC within the selected VP. Because ATM connections are uni-directional, bi-directional communications in an ATM system usually require companion VPIs/VCIs.

The SONET and SDH protocols describe the physical media and protocols upon which the communication of ATM cells takes place. SONET includes optical transmission of optical carrier (OC) signals and electrical transmission of synchronous transport signals (STSs). SONET signals transmit at a base rate of 51.84 Mega-bits per second (Mbps) for optical carrier level one (OC-1) and synchronous transport signal level one (STS-1). Also transmitted are multiples thereof, such as an STS level three (STS-3) and an OC level three (OC-3) at rates of 155.52 Mbps and an STS level twelve (STS-12) and an OC level 12 (OC-12) at rates of 622.08 Mbps, and fractions thereof, such as a virtual tributary group (VTG) at a rate of 6.912 Mbps. SDH includes transmission of optical synchronous transport module (STM O) signals and electrical synchronous transport module (STM E) signals. SDH signals transmit at a base rate of 155.52 Mbps for synchronous transport module level one electrical and optical (STM-1 E/O). Also transmitted are multiples thereof, such as an STM level four electrical/optical (STM-4 E/O) at rates of 622.08 Mbps, and fractions thereof, such as a tributary unit group (TUG) is at a rate of 6.912 Mbps.

Telecommunication systems require call setup information to initiate a connection between communication devices. The call setup uses information in the call signaling to make the correct connection between the communication devices so that the user communications can be transported across the connection between the communication devices.

Calls are placed to a service provider. The service provider processes the call signaling and, based on the information in the call signaling, provides a selected service to process the call. Many calls require only general processing and general services such as basic call routing to the destination point from the originating point or other basic services.

However, enhanced services are sometimes required for call processing. Such enhanced services are generally located at a service node in a service platform and can process the user communications in response to control messages. These enhanced services often use digital signal processing, application programs, and database storage to perform the required processing for the enhanced services. These enhanced services often provide interactive calling features that require a caller to interact with telecommunication network equipment in order to achieve an enhanced service. For example, a call might require voice recognition processing prior to allowing the caller access to an information database. Such a call would likely require enhanced services in which the caller interacts with a voice recognition processor in the telecommunication network.

A system and method are required to dynamically transfer calls through an ATM system to a service platform. The ATM system contains telecommunication communication devices, such as a communication device, a call destination device, and switching equipment, that allows the call to be transported to the correct destination in the ATM network. Thus, there is a need for a system and method to connect calls passing through an ATM system to devices, such as service platforms, that can provide enhanced services. Moreover, this should be completed on a call-by-call basis in real time.

THE SERVICE PLATFORM SYSTEMS

The system of the present invention provides call transmission and call switching in real time in an ATM system within a telecommunication network. The system connects calls passing through the ATM system to service nodes having service platforms that can provide enhanced services for processing the calls. Moreover, it is possible to select specific interactive applications within a service platform to process each call.

FIG. 1 illustrates the use of a service platform system in accordance with the present invention. A telecommunication system 102 has a service platform system 104 that interacts with a first communication device 106 and a second communication device 108. The service platform system 104 contains a signaling processor 110, a service platform 112, and an interworking unit 114. The service platform system 104 can receive one or more calls and route the calls to the appropriate device. The service platform system 104 processes calls using interactive applications.

Links are used to transport call signaling and control messages. The term "link" as used herein means a transmission media used to carry call signaling and control messages. For example, a link carries call signaling or a device control message containing device instructions and/or data. A link can carry, for example, out-of-band signaling such as SS7, C7, ISDN, B-ISDN, GR-303, local area network (LAN), or data bus call signaling. A link can be, for example, an AAL5 data link, UDP/IP, eithernet, or a DS0 over T1. In addition, a link, as shown in the figures, can represent a single physical link or multiple links, such as one link or a combination of links of ISDN, SS7, TCP/IP, or some other data link. The term "control message" as used herein means a control or signaling message, a control or signaling instruction, a control or signaling signal, or signaling instructions, whether proprietary or standardized, that convey information from one point to another.

Connections are used to transport user communications and other device information between the elements and devices of the telecommunication system 102. The term "connection" as used herein means the transmission media used to carry user communications between communication devices or between the elements of the telecommunication system 102. For example, a connection can carry a user's voice, computer data, or other communication device data. A connection can be associated with either in-band communications or out-of-band communications.

A system of links and connections connect the elements of the telecommunication system 102. The signaling processor 110 communicates to the first communication device 106 through a link 116, to the service platform 112 through a link 118, to the interworking unit 114 through a link 120, and to the second communication device 108 through a link 122. The interworking unit 114 communicates to the first communication device 106 through a connection 124, to the service platform 112 through a connection 126, and to the second communication device 108 through a connection 128. It shall be appreciated that other links can extend from the signaling processor 110 to other systems, networks, or devices. In addition, other connections may extend from the interworking unit 114 or from the first and second communication devices 106 and 108 to other systems, networks, or devices.

Each of the first and second communication devices 106 and 108 comprises customer premises equipment, a call processing platform, a switch, or any other device capable of initiating, handling, or terminating a call, including a telephone, a computer, a facsimile machine, a private branch exchange, a service platform, or an enhanced platform that is capable of processing calls. It will be appreciated that other communication devices may be included. However, the number of communication devices shown has been restricted for clarity.

The signaling processor 110 of the service platform system 104 accepts call signaling or control messages from, and transmits call signaling or control messages to, all other elements and devices. The signaling processor 110 thereby controls call routing and call processing in the telecommunication system 102. One embodiment of the signaling processor 110 is discussed in more detail below.

The service platform 112 provides enhanced services for the user communications received by the interworking unit 114. The service platform 112 may have one or multiple applications to provide multiple services. Such services may include voice messaging, facsimile messaging, mail boxes, voice recognition, conference bridging, calling card, menu routing, N00 servicing such as freephone and 900 call servicing, prepay card, tone detection, and call forwarding.

The service platform 112 receives control messages from the signaling processor 110. The control messages instruct the service platform 112 which application to use in the service platform to process the user communications. The service platform 112 processes the user communications and returns processing data results to the signaling processor 110. In addition, the service platform 112 returns the processed user communications to the interworking unit 114 to be transported back to the first or second communication device 106 or 108.

The interworking unit 114 interworks connections on a call-by-call basis. The interworking unit 114 may be an ATM interworking multiplexer that interworks between the ATM format and other formats while providing multiplexing and demultiplexing functions, or it may be an ATM interworking unit that interworks between different types of ATM systems and provides domain addressing. In addition, the interworking unit 114 may be a unit with domain addressing capabilities only, an ATM multiplexer that provides multiplexing and demultiplexing functions for ATM cells, or other types of interworking units.

The interworking unit 114 accepts user communications from, and transports user communications to, the first communication device 106, the second communication device 108, and the service platform 112. Preferably, the interworking unit 114 is an ATM interworking multiplexer that interworks between the first communication device 106 that communicates user communications in a TDM format over a DS0, the service platform 112 that communicates user communications in the TDM format over a DS0, and the second communication device 108 that communicates user communications in the ATM format over a SONET pipe or an SDH pipe. However, it will be appreciated that the first and second communication devices 106 and 108 may be either TDM or ATM devices, and interworking can be completed between any formats. One type of interworking unit that is compatible with the present system is discussed more fully below.

The interworking unit 114 accepts control messages from, and sends control messages to, the signaling processor 110. The interworking unit 114 uses the information gained from the signaling processor's control message to identify the required interworking assignment so that the user communications are converted between the formats that are compatible with the first communication device 106, the second communication device 108, and the service platform 112.

A selected connection is designated by a selected VPI/VCI for ATM formatted transmissions, or a selected DS0 for TDM transmissions. The interworking unit 114 therefore dynamically interworks selected VPI/VCIs to selected DS0s and dynamically interworks selected DS0s to selected VPI/VCIs. Because DS0 communications are bi-directional and ATM communications are typically uni-directional, companion VPI/VCIs may be required for interworking between a DS0 and ATM.

In addition, the interworking unit 114 has a TDM interworking function which allows the interworking unit to transport the user communications between the service platform 112 and the first or second communication devices 106 or 108 without converting the user communications to another format. This can occur, for example, when the user communications that are transferred from the first or second communication device 106 or 108 are in the same format as the format usable by the service platform 112.

Referring back to FIG. 1, the system operates as follows. In the preferred enhanced service processing system, a call is received into the service platform 112 from a communication device, such as the second communication device 108. The call signaling is transported from the second communication device 108 to the signaling processor 110. The user communications are transported in ATM cells from the second communication device 108 to the interworking unit 114.

The signaling processor 110 processes the call signaling. The signaling processor 112 reads the call characteristics such as the routing label, including the origination point code (OPC), the destination point code (DPC), the circuit identification code (CIC), or the signaling link selection (SLS). Based on the processing of the call characteristics in the call signaling, the signaling processor 110 determines what action is to be taken, which service the call requires, and, when a plurality of service platforms exist, which service platform and which application in the service platform can provide the service. The signaling processor 110 sends a processor control message to the selected service platform 112 designating the application that is to process the user communications.

In addition, based on the call signaling processing, the signaling processor 110 selects a connection 126 from the interworking unit 114 to the service platform 112 for the user communications. The signaling processor 110 sends a processor control message to the interworking unit 114 designating the selected connection.

The interworking unit 114 receives both the user communications from the second communication device 108 and the processor control message from the signaling processor 110. The interworking unit 114 converts the ATM cells containing the user communications to a form that is compatible with the service platform 112. Generally, the ATM cells are converted into a TDM format. The interworking unit 114 then uses the information gained from the processor control message to route the user communications to the service platform 112 over the selected connection 126. The selected connection 126 is generally a selected DS0.

The service platform 112 receives both the user communications from the interworking unit 114 and the processor control message from the signaling processor 110. The service platform 112 uses the information in the processor control message to process the user communications using the selected interactive application. When the application has completed, the service platform 112 transmits the processing results to the signaling processor 110 and the processed user communications to the interworking unit 114 to be transported either back to the second communication device 108 or to another service platform or device (not shown). The processing results contain control messages and data that allows the signaling processor 10 to reroute the processed user communications to another service platform, to the second communication device 108, or to the first communication device 106.

If the user communications are transported to the second communication device, the user communications must be interworked to ATM cells that identify the VPI/VCI of the selected connection 128. If, however, the user communications are transported to the first communication device 106, the user communications do not need to be converted to ATM cells. In the present example, the user communications are transported to the first communication device 106. The processing results and processed user communications are transported to the signaling processor 110 and the first communication device 106, respectively, either throughout the duration of the call or at the completion of the call.

In addition to transferring the processing results, the service platform 112 also transmits a service complete signal to the signaling processor 110. The signaling processor 110 receives the service complete signal and the processing results and processes them to determine if the processed user communications are to be transferred to a different device.

If more processing is required, the signaling processor 110 selects a connection and transmits a processor control message to the interworking unit 114 designating the new selected connection to either the second communication device 108 or to a new selected device (not shown). If the selected device is an ATM device, the interworking unit 114 converts the processed user communications which it received from the service platform 112 to ATM cells that identify the selected connection. The ATM cells would, for example, identify the VPI/VCI of the connection to the selected device. The interworking unit 114 then transmits the ATM cells over the connection to the selected device. The conversion of the user communications to ATM cells and the transmission of the ATM cells over the connection occurs dynamically in real time.

It will be appreciated that the call can be handled, initiated, or terminated by either of the first or second communication devices 106 or 108. For example, the user communications can be transported by the first communication device 106 and received ultimately by the second communication device 108. Alternately, the user communications can be transported from one of the first or second communication devices 106 or 108, processed by the service processor 112, and transported back to the same communication device 106 or 108.

Also, it will be appreciated that, although in the above-described operation of the system the first communication device 106 was a TDM device, the service platform 112 was a TDM device, and the second communication device 108 was an ATM device, the first and second communication devices 106 and 108 and the service platform 112 can receive, transport, and handle user communications in any required format. Thus, the user communications can be processed in a system where the first communication device 106 is an ATM device, the service platform 112 is a TDM device, and the second communication device 108 is a TDM device or in a system where the first communication device 106 is an ATM device, the service platform 112 is a TDM device, and the second communication device 108 is an ATM device. In addition, the user communications can be processed in a system where the first communication device 106 is an ATM device, the service platform 112 is an ATM device, and the second communication device 108 is an ATM device or in a system where the first communication device 106 is a TDM device, the service platform 112 is an ATM device, and the second communication device 108 is a ATM device. In each of these instances, the signaling processor 110, the service platform 112, and the interworking unit 114 operate similarly to the operation described above. As one skilled in the art will appreciate, the interworking for the user communications will be determined according to the format of the devices.

Figure 2:
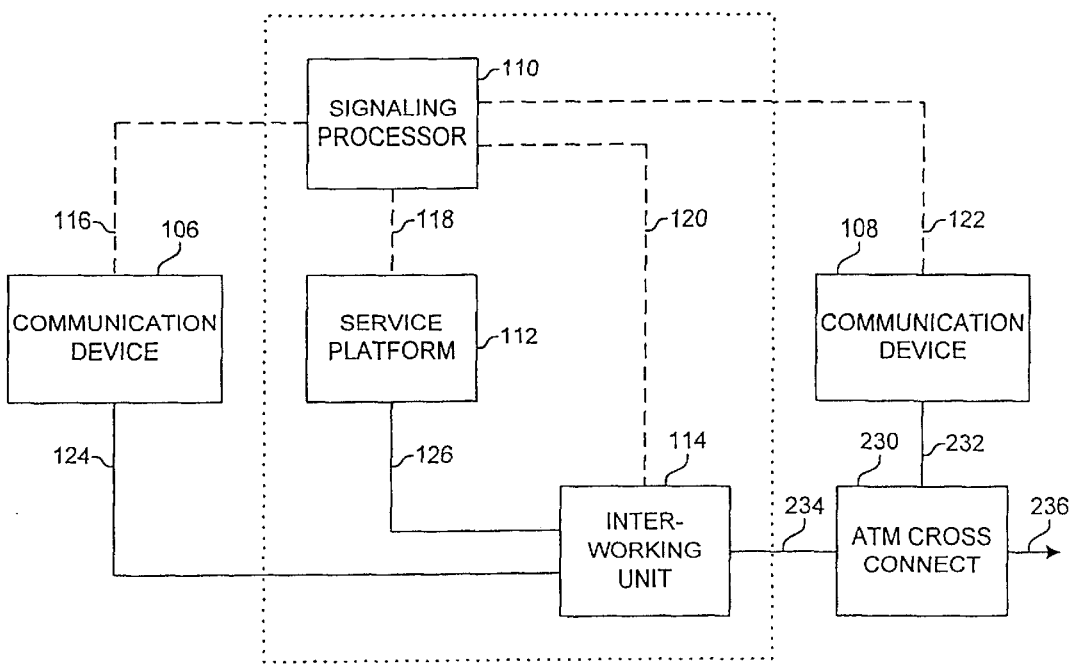
FIG. 2 is a block diagram of a service platform system operating with a time division multiplex device in accordance with the present invention.

FIG. 2 illustrates a telecommunication system 102 in which an ATM cross connect 230 is used to route calls. The cross connect 230 has a connection 232 to the second communication device 108 and a connection to the interworking unit 114. The cross connect 230 receives ATM cells from the interworking unit 114 over the connection 234 and directs the ATM cells to the second communication device 108 over the connection 232 therebetween. Alternatively, the cross connect 230 can route calls to another ATM system over a connection 236.

Figure 3:
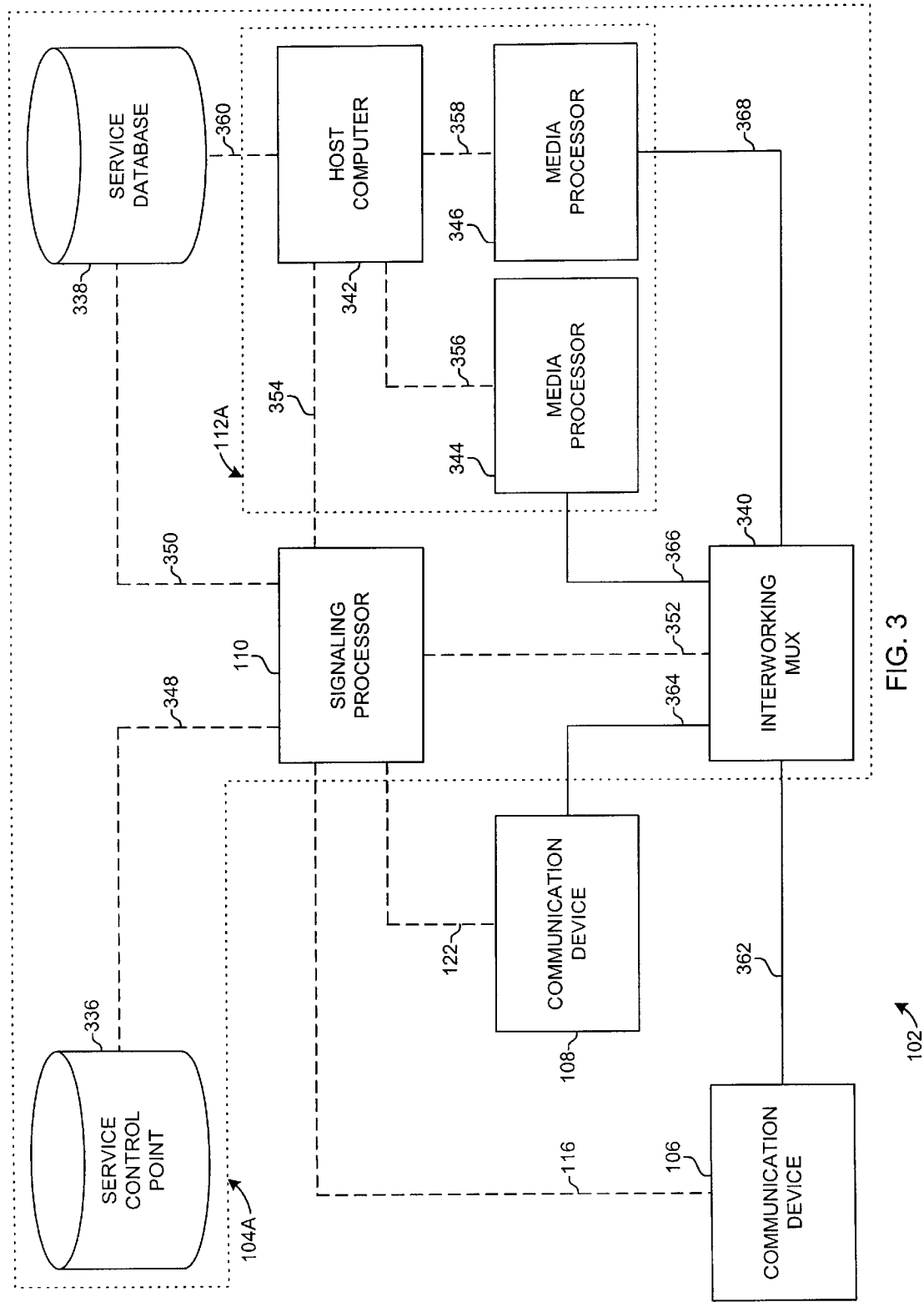
FIG. 3 is a block diagram of a service platform system with an extended asynchronous transfer mode system in accordance with the present invention.

As illustrated in the telecommunication system 102 of FIG. 3, a service platform system 104A may contain many elements. A first communication device 106 to and a second communication device 108 interact with the service platform system 104A. The service platform system 104A contains a signaling processor 110 and a service platform 112A.

In addition, the service platform system 104A contains a service control point 336, a service database 338, and an interworking multiplexer (mux) 340. The service platform 112A contains a host computer 342, a first media processor 344, and a second media processor 346. However, a service platform can have greater or fewer media processors in addition to other devices.

Call signaling and control messages are carried between the telecommunication system 102 devices on links. The signaling processor 110 communicates to the first communication device 106 through a link 116, to the second communication device 108 through a link 122, to the service control point 336 through a link 348, to the service database 338 through a link 350, to the interworking mux 340 through a link 352, and to the host computer 342 through a link 354. Preferably, the links 116, 122, 348, 350, 352, and 354 are a LAN, SS7 links, or SS7 over ATM.

The host computer 342 communicates with the first media processor through a link 356, to the second media processor 346 through a link 358, and to the service database 338 through a link 360. Preferably, links 356, 358, and 360 are either a LAN or a data bus.

User communications are carried between the telecommunication system 102 devices on connections. The interworking mux 340 communicates to the first communication device 106 through a connection 362, to the second communication device 108 through a connection 364, to the first media processor 344 through a connection 366, and to the second media processor 346 through a connection 368.

The service platform system 104A can receive one or more calls and route the calls to the appropriate equipment. The signaling processor 110 accepts control messages from, and transmits control messages to, other elements and equipment. The signaling processor 110 thereby controls call routing and call processing in the telecommunication system The service control point (SCP) 336 contains information about the telecommunication system 102 and how to route calls through the telecommunication network. The SCP 336 is queried by the signaling processor 110 to determine how to route calls with advanced routing features such as N00 or menu routing. The signaling processor 110 may pass the information it gains from the SCP 336 to the host computer 342 in the processor control message.

The service database 338 is a logically centralized data storage device from which the signaling processor 110 or the host computer 342 can retrieve communication device data or other device data. The service database 338 has two aspects of a user or device profile. First, the service database 338 has service subscription data and processing options which denote the services to which a particular call or communication device has access. Second, the service database 338 has service data which is stored on behalf of a call or communication device. Service data includes such information as voice messages, facsimile messages, and electronic mail.

The interworking mux 340 interworks between ATM cells and other call formats while providing multiplexing and demultiplexing functions. The interworking mux 340 accepts user communications from the second communication device 108 and from the first communication device 106. The interworking mux 340 accepts a processor control message containing signaling and control information from the signaling processor 110.

The processor control message from the signaling processor 110 designates a selected connection from the interworking mux 340 to either the first media processor 344 or the second media processor 346. In addition, a processor control message designates a selected connection from the interworking mux 340 to either the first communication device 106 or the second communication device 108. A selected connection is designated by a selected VPI/VCI or a selected DS0. The interworking mux 340 routes the user communications over the selected connection.

User communications are communicated back and forth between the interworking mux 340 to be transported to another device and either the first media processor 344 or the second media processor 346, or both. The interworking mux 340 uses the information gained from the signaling processor's processor control message to convert the user communications received from the second communication device 108, for example, between ATM cells and a format that is compatible with the media processors 344 and 346.

The media processors 344 and 346 contain applications that process the user communications. The media processors 344 and 346 perform such processing as tone detection and collection. The media processors 344 and 346 collect any information from the user communications that is required to complete an application or manipulate the user communications. The media processors 344 and 346 run applications that process voice and tones. The media processors 344 and 346 report the processing results of the processed data to the host computer 342 or to the signaling processor 110 in a media data signal. In some instances, raw data from the user communications and processed user communications are transferred to the host computer 342 for further processing.

In one embodiment, the system operates as follows where a call is initiated from the second communication device 108 and the processed user communications return to the second communication device. The host computer 342 is the service node manager that controls devices on the service node or service platform 112A. The host computer 342 receives a processor control message from the signaling processor 110. The processor control message instructs the host computer 342 which application to use in the media processors 344 and 346 to process the user communications. The host computer 342 controls the user communications processing in the media processors 344 and 346 and returns processed data results to the signaling processor 110 in a host computer data signal. The host computer 342 instructs the media processors 344 and 346 to return the processed user communications to the interworking mux 340 to be transported back to the second communication device 108. The host computer 342 may also send a host control message to the signaling processor 110 with control messages such as a service complete message. It will be appreciated that other calls can be placed to and from other devices.

In another embodiment, the system operates as follows where the first communication device 106 places a call that is to be processed and returned to the first communication device. The call signaling is transported to the signaling processor 110 so that the signaling processor 110 can route the call to the appropriate device. The user communications are transported to the interworking mux 340 to be transported to an appropriate service, such as the media processors 344 and 346. After the user communications are processed, it is transported from the media processors 344 or 346, through the interworking mux 340, and back to the first communication device 106. The first communication device 106 can transmit the call in a variety of formats, including SF, ESF, ISDN, B-ISDN, and GR-303 and over a variety of transmission media including TDM, SONET, and SDH.

Referring still to FIG. 3, the operation of the system 104A is as follows. In the system, the signaling processor 110 controls the host computer 342 and the media processors 344 and 346 that process user communications which pass through an ATM system. The signaling processor 110 selects connections as needed to connect the devices in the telecommunication system 102.

A call is received into the service platform system 104A from the second communication device 108. The call signaling is transported from the second communication device 108 to the signaling processor 110. The user communications are transported in ATM cells from the second communication device 108 to the interworking mux 340.

The signaling processor 110 processes the call signaling. The signaling processor 110 processes the call characteristics in the call signaling. Based on the processing of the call characteristics, the signaling processor 110 determines which service the call requires and which host computer and media processor and which application in the media processor can provide the service.

However, sometimes the call characteristics are not sufficient to determine the specific communication device that is requesting a service or to determine the specific requested service desired. This may occur, for example, when a device dials an "800" number to gain access to a calling card service. In such a situation, a service application may require a personal identification code before access to a service is provided. The signaling processor 110 then may invoke applications in the signaling processor 110 or in the media processor 344 that can interact with the call to determine the device identity or desired service.

In addition, the signaling processor 110 may query the SCP 336 or the service database 338. This would allow the signaling processor 110 to gain service options, service data, and routing information for the call to determine the required combination of signal processing, database, and connection providing elements to provide a service.

The call signaling is processed and the signaling processor 110 determines the resource needed to process the service request. The signaling processor 110 then sends a processor control message to the selected host computer 342 designating the application that is to process the user communications. In addition, based on the processed call signaling, the signaling processor 110 selects a connection from the interworking mux 340 to the media processor 344 selected to process the user communications. The signaling processor 110 sends a processor control message to the interworking mux 340 designating the selected connection 366 and instructing the interworking mux 340 to dynamically connect the call in real time to a service platform 112A on the connection 366 and to convert the user communications in the interworking mux 340 from the ATM cells to a format that is compatible with the selected media processor 344.

The interworking mux 340 receives both the user communications from the second communication device 108 and the processor control message from the signaling processor 110. The interworking mux 340 converts the ATM cells containing the user communications to a form that is compatible with the selected media processor 344. Generally, the ATM cells are converted into a TDM format. The interworking mux 340 then uses the information gained from the processor control message to route the user communications to the selected media processor 344 over the selected connection 366.

The user communications are received in the selected media processor 344. In addition, the host computer 342 transmits a host control message to the media processor 344 instructing the media processor 344 which application to use and providing other control messaging to control the processing of the user communications. The media processor 344 processes the user communications in accordance with the control messages from the host computer 342. The media processor 344 then reports the processing results to the host computer 342 in a media processor signal over the link 354. In addition, the media processor 344 transmits the processed user communications to the interworking mux 340.

The host computer 342 can further service the processing results. The host computer 342 transfers the processing results, with or without further servicing, to the signaling processor 110 in a host control message. The host control message may request that the host computer 342 and the associated media processor 344 be released because processing is complete or it can request another service or media processor. When the signaling processor 110 receives the host control message, it may direct the interworking mux 340 to transfer the processed user communications to the second communication device 108 or to the first communication device 106. In addition, the signaling processor 110 may direct the interworking mux 340 to transfer the processed user communications to another service platform or another media processor on the same service platform 112A. If the processing is complete, the interworking mux 340 will be instructed by the signaling processor 110 to release the connection to the media processor 344, at which point the connection will be released.

Figure 4:
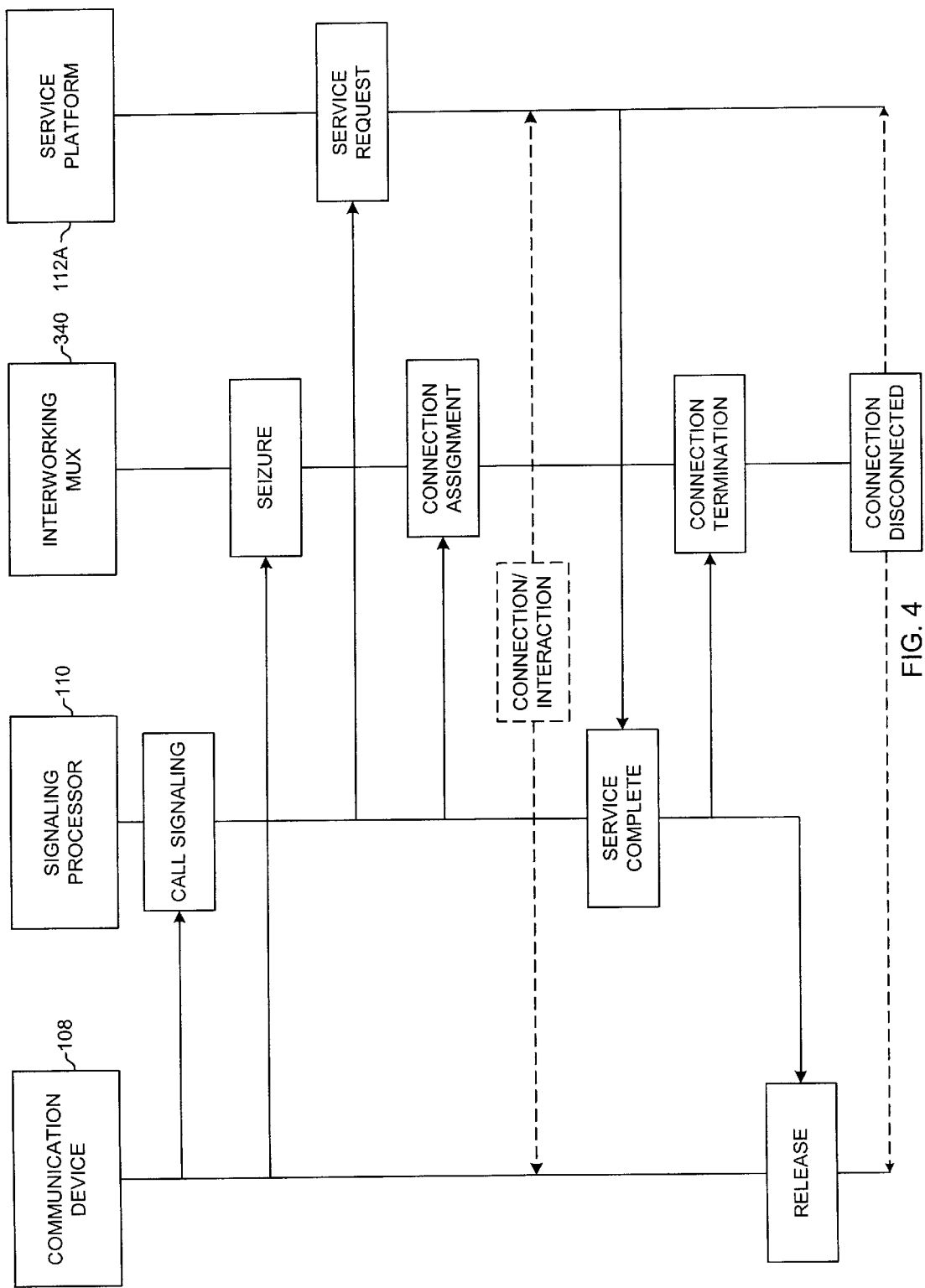
FIG. 4 is a message sequence chart for a service platform in accordance with the present invention.

FIG. 4 illustrates the message transmissions for the user communications processing and the control messages that take place between the various telecommunication network devices to process a call. The message sequences illustrate the method for connecting a call through an ATM system to a service platform.

With reference to FIG. 3 and FIG. 4, a communication device 108 transmits a call, including call signaling and user communications. The call signaling is received in the signaling processor 110, and the user communications are transported to an interworking mux 340 upon a connection that was seized by the second communication device 108.

The signaling processor 110 processes the call signaling to determine which application and service platform is required to process the user communications. The signaling processor 110 selects a connection to the selected service platform 112A. The signaling processor 110 transmits a processor control message to the service platform 112A requesting service for the user communications. The service request designates the application that will process the user communications and designates the connection between the service platform 112A and the interworking mux 340 upon which the user communications will be transported.

In addition, the signaling processor 110 transmits a processor control message to the interworking mux 340 designating the selected connection assignment to the selected service platform 112A. When the service platform 112A is connected to the interworking mux 340 by a DS level transmission line, the connection assignment is a TDM port number, such as a DS0 port designation or an E0 port designation.

The interworking mux 340 connects to the service platform 112A on the selected connection. When the service platform 112A is in a TDM system and the second communication device 108 is in an ATM system and is transmitting the user communications in ATM cells, the interworking mux 340 interworks the VPI/VCI of the connection from which the ATM cells are being received to the DS0 or E0 of the connection to the service platform 112A. When, however, processed user communications are being transported from the service platform 112A to the interworking mux 340, the interworking mux interworks the DS0 or E0 of the connection from which the processed user communications are being received from the service platform 112A to the VPI/VCI of the selected connection to the second communication device 108 or other selected communication device 108. The VPI/VCI of the selected connection back to the second communication device 108 or to some other selected communication device is designated in a processor control message. The second communication device 108 and the service platform 112A may interact, thereby transmitting user communications to each other through the interworking mux 340 over the selected connection.

The interworking mux 340 interworks the user communications transmission between the format of the second communication device 108 and a format compatible with the service platform 112A. In the preferred method, the user communications are converted from ATM cells received from the second communication device 108 to a TDM format that is transported over a DS0 or E0 to the service platform 112A. In the reverse direction, processed user communications received from the service platform 112A over the DS0 or E0 in the TDM format are converted to ATM cells that identify the VPI/VCI for the connection to the second communication device 108, or to some other selected device. The selected connection designations for both the second communication device 108 and the service platform 112A are received in the interworking mux 340 from the signaling processor 110.

When the processing of the user communications is completed by the service platform 112A, it transmits to the signaling processor 110 a control message having a service complete message. Upon receiving the control message, the signaling processor 110 sends a processor control message to the interworking mux 340 requesting that the connection be terminated and to the second communication device 108 requesting that the connection be released. In response to the processor control message, the connections are disconnected.

Figure 5:
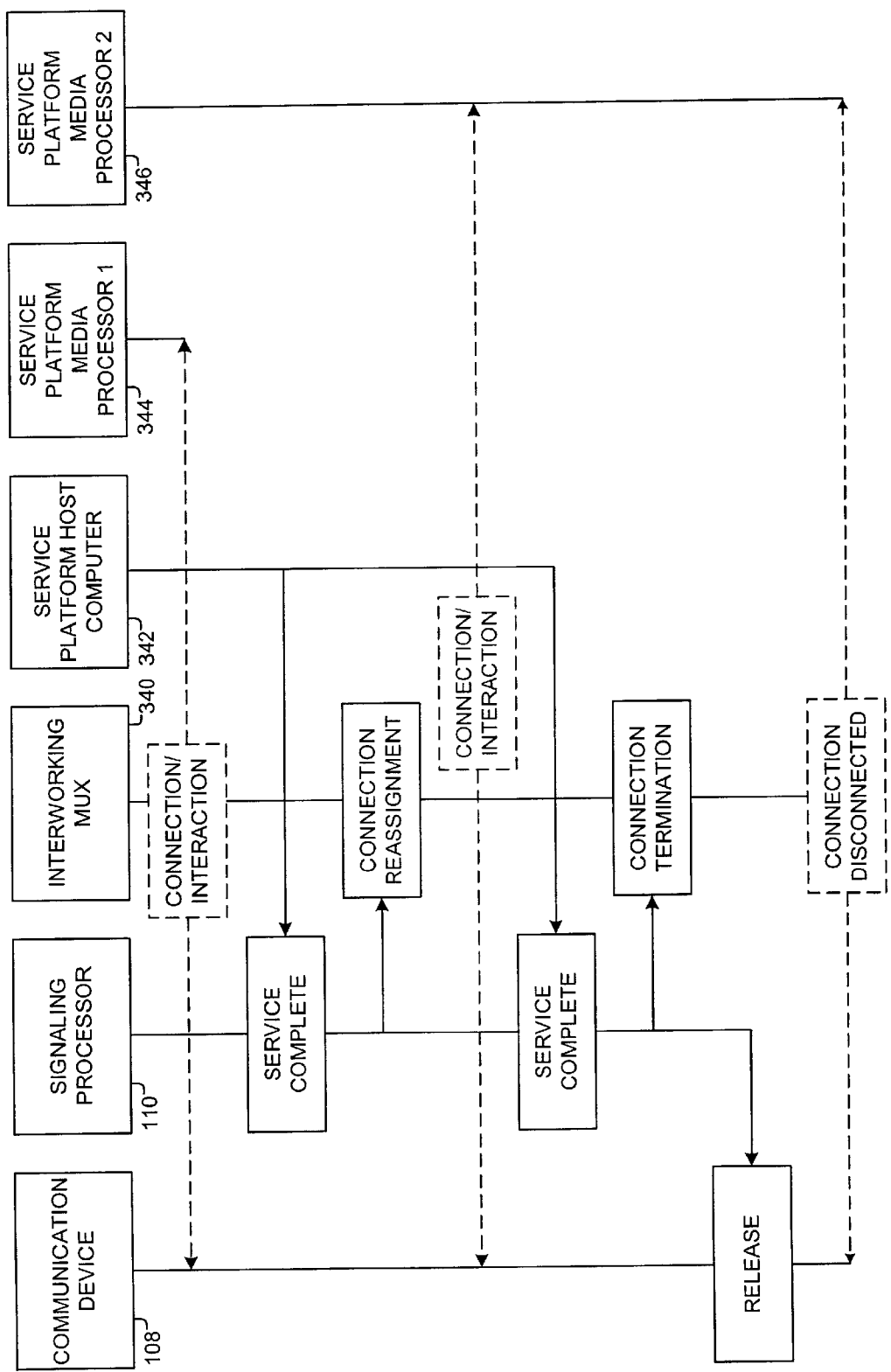
FIG. 5 is a message sequence chart for a plurality of service platforms.

With reference to FIG. 3 and FIG. 5, after a connection has been made and the user communications have been processed in a first media processor, the signaling processor 110 may determine that further processing is required and select an application in the second media processor 346 to further process the user communications. The signaling processor 110 would transmit a second processor control message to the interworking mux 340 designating a second selected connection 368 to the second media processor 346.

In response to the second processor control message, the interworking mux 340 disassociates the connection to the first media processor 344 and makes the second selected connection to the second media processor 346. Then, the interworking mux 340 transmits the user communications to the second media processor 346 over the second selected connection.

In addition, the signaling processor transmits another processor control message to the host computer 342 designating a selected application in the second media processor 346 to process the user communications. In response to the processor control message, the host computer 342 transmits a host control message to the second media processor 346 to control processing of the user communications and reporting of the processing results.

FIG. 5 illustrates the message transmissions that take place between the various telecommunication system 102 devices to further process user communications in a second media processor 346. The message sequences illustrate the method for connecting a call through an ATM system from a first media processor 344 to a second media processor 346 after a connection to the first media processor has been completed. Both media processors 344 and 346 are controlled by a single host computer 342.

After the first connection is made by the interworking mux 340 and interaction occurs between the second communication device 108 and the first media processor 344 in the service platform 112A (see FIG. 3), the host computer 342 may request that further user communications processing be completed in the second media processor 346. The host computer 342 then transmits to the signaling processor 110 a host control message containing a service complete message. Alternatively, the signaling processor 110 may initiate the processing in the second media processor 346.

Upon receiving the host control message, the signaling processor 110 selects a connection reassignment to the second media processor 346 and transmits to the interworking mux 340 a processor control message designating the second selected connection. In a TDM system, the designation of the second selected connection to the second media processor 346 is a TDM port designation, such as a DS0 or an E0.

Upon receiving the processor control message, the interworking mux 340 disassociates the connection to the first media processor 344 and interworks the user communications with the selected connection to the second media processor 346. The second communication device 108 and the media processor device 346 interact as described above.

When the processing of the user communications are completed by the second media processor 346, the host computer 342 transmits to the signaling processor 110 a host control message having a service complete message. Upon receiving the host control message, the signaling processor 110 sends a processor control message to the interworking mux 340 requesting that the connection be terminated and to the second communication device 108 requesting that the connection be released. In response to the processor control message, the connections are disconnected.

Figure 6:
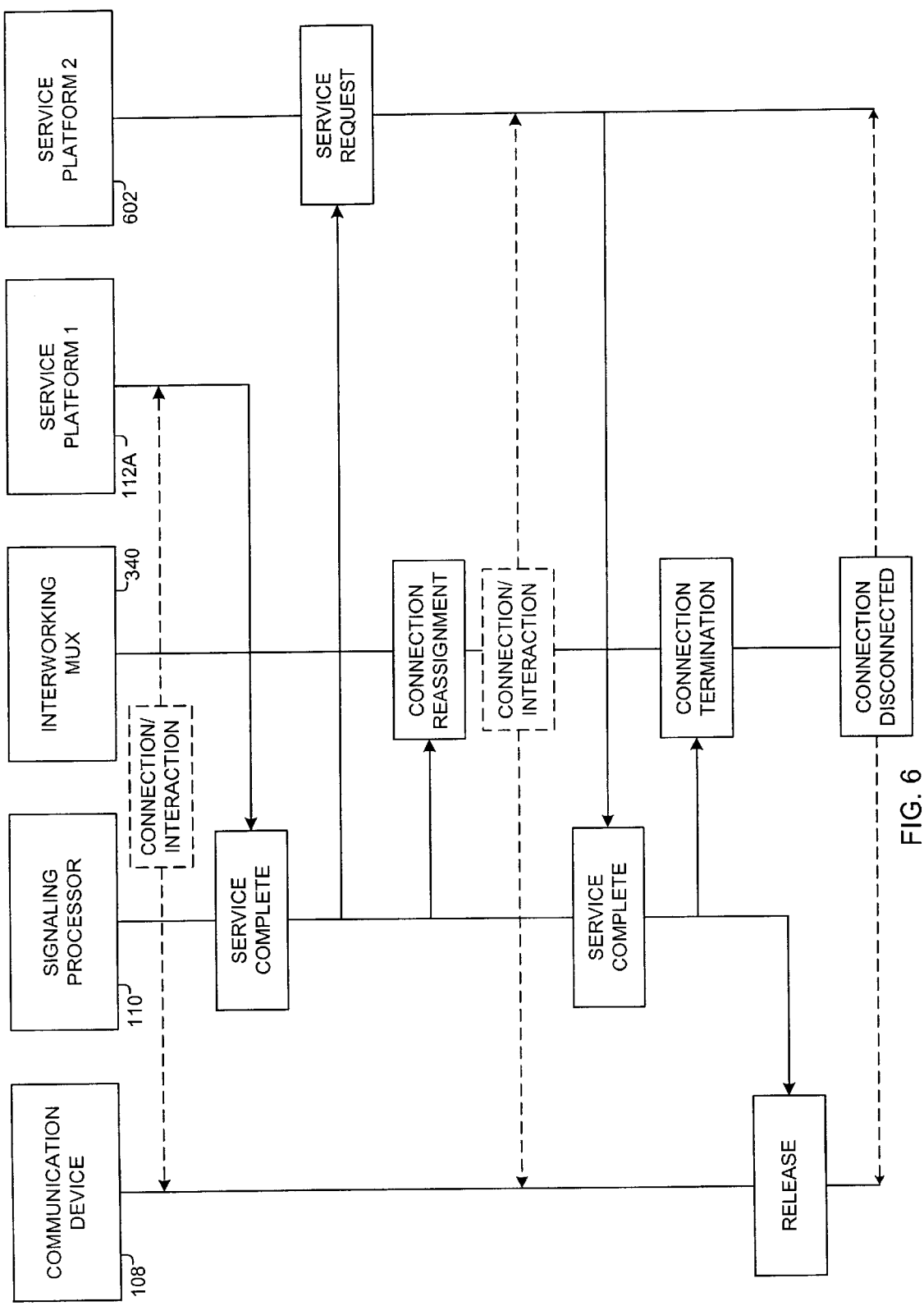
FIG. 6 is a message sequence chart for a service platform with a plurality of media processors in accordance with the present invention.

FIG. 6 illustrates the message transmissions that take place between the various telecommunication system devices to further process user communications in a second service platform 602 after the user communications first has been processed by a first service platform 112A (see FIG. 3). The message sequences illustrate the method for connecting a call through an ATM system from a first service platform 112A to a second service platform 602 after a connection to the first service platform has been completed.

After the initial connection is made by the interworking mux 340 and interaction occurs between the second communication device 108 and the first service platform 112A, the first service platform 112A may require that further user communications processing be completed in the second service platform 602. The first service platform would transmit to the signaling processor 110 a control message having a service complete. Alternatively, the signaling processor 110 may initiate the processing in the second service platform 602.

Upon receiving the control message, the signaling processor 110 selects a connection reassignment to the second service platform 602 and transmits a processor control message to the interworking mux 340 designating the selected connection reassignment. In a TDM system, the designation of the selected connection to the second service platform 602 is a TDM connection designation, such as a DS0 or E0 designation.

Upon receiving the processor control message, the interworking mux 340 disassociates the connection to the first service platform 112A and interworks the user communications to the selected connection to the second service platform 602. The second communication device 108 and second service platform 602 can then interact as described above.

When the processing of the user communications are completed by the second service platform 602, the second service platform transmits to the signaling processor 110 a control message having a service complete message. Upon receiving the control message, the signaling processor 110 sends a processor control message to the interworking mux 340 requesting that the connection be terminated and to the second communication device 108 requesting that the connection be released. In response to the respective processor control messages, the connections are disconnected.

Figure 7:
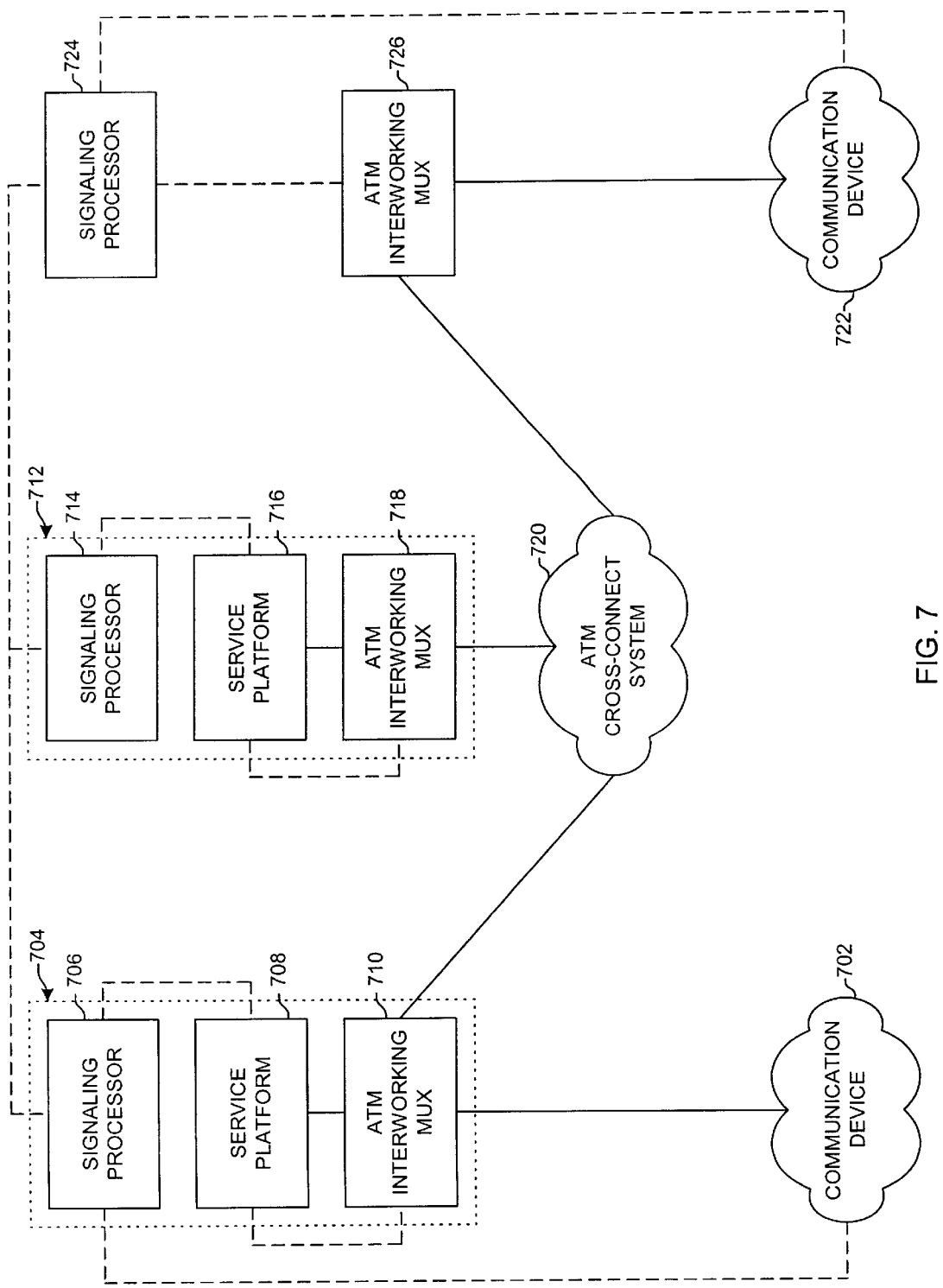
FIG. 7 is a functional diagram of a plurality of service platforms interacting in an asynchronous transfer mode system.

FIG. 7 illustrates the interaction that may take place between service platforms and communication devices when multiple service platforms are required for call processing or when call processing is required by a communication device that does not have local access to a service platform. For example, a local communication device 702 is connected to a local service platform system 704 which contains a local signaling processor 706, a local service platform 708, and a local ATM interworking mux 710.

The local communication device 702 transmits a call to the local service platform system 704 for processing of the call by an inexpensive application or by an application that is used often. The call signaling is transported to the local signaling processor 706, and the user communications are transported to the local ATM interworking mux 710. The signaling processor 706 selects a connection to the local service platform 708 from the local ATM interworking mux 710 and transmits a processor control message to the local ATM interworking mux 710 designating the selected connection. In addition, the signaling processor transmits a processor control message to the local service platform 708 designating the application to process the user communications. The local ATM interworking mux 710 transmits the user communications to the local service platform 708 over the selected connection, and the local service platform 708 processes the user communications.

Alternatively, the local communication device 702 may transmit a call designated for a core service platform system 712. The core service platform system 712 contains expensive applications or infrequently used applications that are shared by a plurality of communication devices and other devices in the telecommunication network. The core service platform system contains a core signaling processor 714, a core service platform 716, and a core ATM interworking mux 718.

The local communication device 702 can access the core service platform system 712 by transporting call signaling to the local signaling processor 706. The local signaling processor 706 transports the call signaling to the core signaling processor 714.

In addition, the local communication device 702 transports user communications to the local ATM interworking mux 710. The local ATM interworking mux 710 receives a processor control message from the local signaling processor designating a selected connection to the core ATM interworking mux 718 through an ATM cross connect system 720 and the VPI/VCI of the selected connection. The local ATM interworking mux 710 converts the user communications to ATM cells that identify the VPI/VCI of the selected connection and transmit the ATM cells to the ATM cross connect system 720. The ATM cross connect system 720 cross connects the ATM cells to the selected connection with the VPI/VCI and routes the ATM cells to the core ATM interworking multiplexer 718.

In addition, the core signaling processor 714 selects a connection to the core service platform 716 and transmits to the core ATM interworking mux 718 a processor control message designating the selected connection. The core ATM interworking mux 718 converts the ATM cells to user communications having a format that is compatible with the core service platform 716 and transmits the user communications over a selected connection to the core service platform 716 for processing. A processor control message from the core signaling processor 714 to the core service platform 716 designates the applications and controls to process the user communications.

In a similar fashion, a communication device 722 that does not have a local service platform can transmit a call to be processed by the core service platform system 712 or by the local service platform system 704. The communication device 722 transmits call signaling to the communication device signaling processor 724 and user communications to the ATM interworking mux 726. The signaling processor 724 controls transmission of the call signaling and the user communications to the appropriate system.

Figure 8:
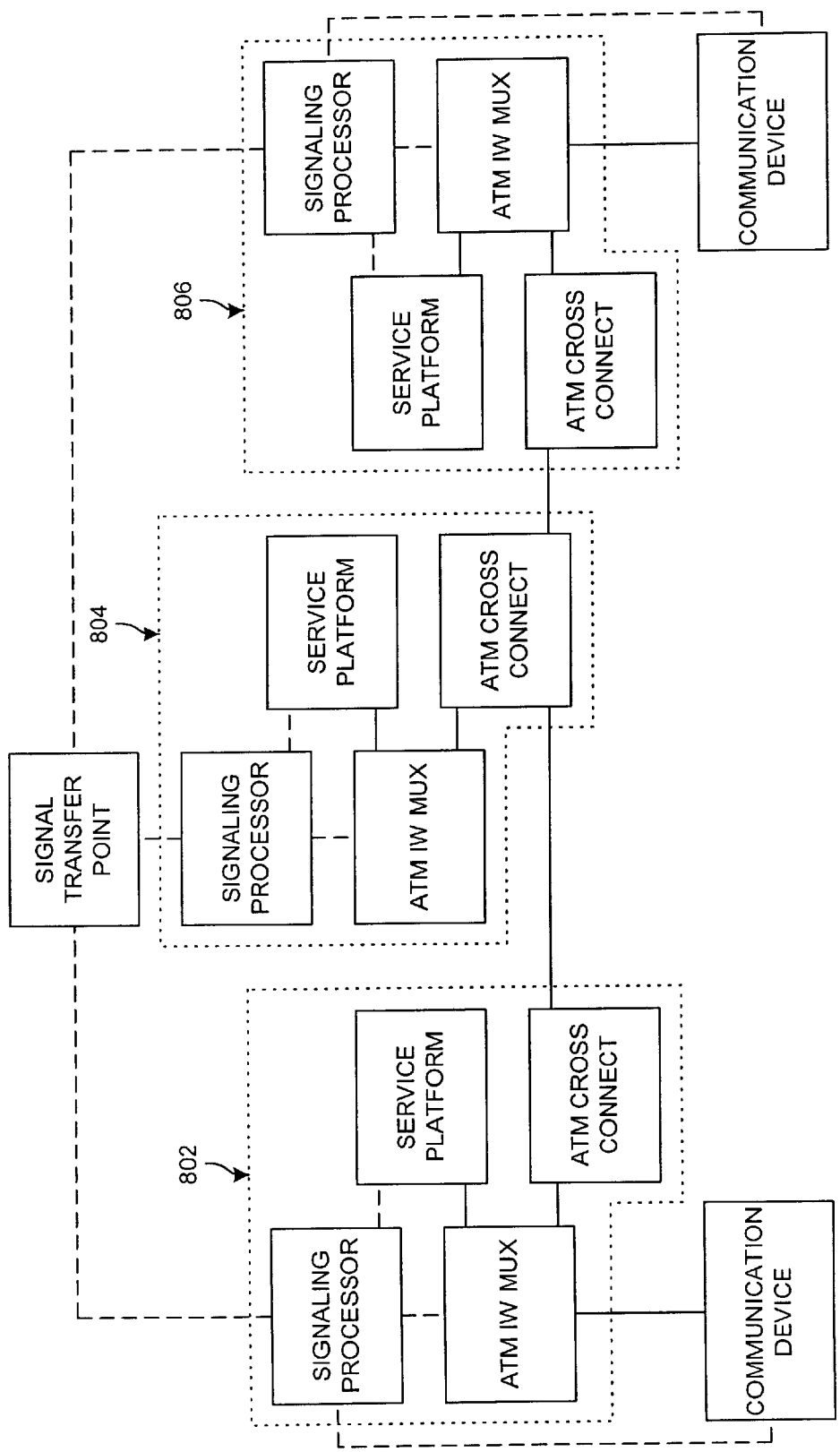
FIG. 8 is a block diagram of a plurality of service platforms interacting in an asynchronous transfer mode system.

FIG. 8 illustrates the interaction of service platforms in a telecommunication network. In FIG. 8, a local service platform system 802 interacts with an edge service platform system 804. The edge platform system 804 likewise interacts with a core service platform system 806. Any one of the service platform systems 802, 804, and 806 can transmit a call to any other system.

THE ATM INTERWORKING MULTIPLEXER

FIG. 9 shows one embodiment of an ATM interworking multiplexer (mux) 902 that is suitable for the present invention, but other multiplexers that support the requirements of the invention are also applicable. The ATM interworking mux 902 has a control interface 904, an OC-N/STS-N interface 906, a DS3 interface 908, a DS1 interface 910, a DS0 interface 912, a signal processor 914, an ATM adaptation layer (AAL) 916, an OC-M/STS-M interface 918, and an ISDN/GR-303 interface 920.

The control interface 902 accepts control messages from the signaling processor 922. In particular, the control interface 904 identifies DS0 connections and virtual connection assignments in the control messages from the signaling processor 922. These assignments are provided to the AAL 916 for implementation.

The OC-N/STS-N interface 906, the DS3 interface 908, the DS1 interface 910, the DS0 interface 912, and the ISDN/GR-303 interface 920 each can accept calls, including user communications, from a communication device 924. Likewise, the OC-M/STS-M interface 918 can accept calls, including user communications, from a communication device 926.

The OC-N/STS-N interface 906 accepts OC-N formatted communication signals and STS-N formatted communication signals and converts the communication signals from the OC-N or STS-N formats to the DS3 format. The DS3 interface 908 accepts communication signals in the DS3 format and converts the communication signals to the DS1 format. The DS3 interface 908 can accept DS3s from the OC-N/STS-N interface 906 or from an external connection. The DS1 interface 910 accepts the communication signals in the DS1 format and converts the communication signals to the DS0 format. The DS1 interface 910 can accept DS1s from the DS3 interface 908 or from an external connection. The DS0 interface 912 accepts communication signals in the DS0 format and provides an interface to the AAL 916. The ISDN/GR-303 interface 920 accepts communication signals in either the ISDN format or the GR-303 format and converts the communication signals to the DS0 format. In addition, each interface may transmit signals in like manner to the communication device 924.

The OC-M/STS-M interface 918 is operational to accept ATM cells from the AAL 916 and to transmit the ATM cells over the connection to the communication device 926. The OC-M/NSTS-M interface 918 may also accept ATM cells in the OC or STS format and transmit them to the AAL 916.

The AAL 916 comprises both a convergence sublayer and a segmentation and reassembly (SAR) sublayer. The AAL 916 is operational to accept call origination device information in the DS0 format from the DS0 interface 912 and to convert the call origination device information into ATM cells. AALs are known in the art and information about AALs is provided by International Telecommunications Union (ITU) document I.363, which is hereby incorporated fully herein by reference. An AAL for voice communication signals is described in U.S. patent application Ser. No. 08/395,745, which was filed on Feb. 28, 1995, and entitled "Cell Processing for Voice Transmission," and which is incorporated herein by reference.

The AAL 916 obtains from the control interface 904 the virtual path identifier (VPI) and the virtual channel identifier (VCI) for each DS0 for each call connection. The AAL 916 also obtains the identity of the DS0 for each call (or the DS0s for an N×64 call). The AAL 916 then transfers the call origination device information between the identified DS0 and the identified ATM virtual connection. An acknowledgment that the assignments have been implemented may be sent back to the signaling processor 922 if desired. Calls with multiple 64 Kilo-bits per second (Kbps) DS0s are known as N×64 calls. If desired, the AAL 916 can be configured to accept control messages through the control interface 904 for N×64 calls.

As discussed above, the ATM interworking mux 902 also handles calls in the opposite direction, that is, in the direction from the OC-M/STS-M interface 918 to the DS0 interface 912, including calls exiting from the DS1 interface 910, the DS3 interface 908, the OC-N/STS-N interface 906, and the ISDN/GR-303 interface 920. For this traffic, the VPI/VCI has been selected already and the traffic has been routed through the cross-connect (not shown). As a result, the AAL 916 only needs to identify the pre-assigned DS0 for the selected VPI/VCI. This can be accomplished through a look-up table. In alternative embodiments, the signaling processor 922 can provide this DS0-VPI/VCI assignment through the control interface 904 to the AAL 916.

A technique for processing VPI/VCIs is disclosed in U.S. patent application Ser. No. 08/653,852, which was filed on May 28, 1996, and entitled "Telecommunications System with a Connection Processing System," and which is incorporated herein by reference.

DS0 connections are bi-directional and ATM connections are typically uni-directional. As a result, two virtual connections in opposing directions will typically be required for each DS0. Those skilled in the art will appreciate how this can be accomplished in the context of the invention. For example, the cross-connect can be provisioned with a second set of VPI/VCIs in the opposite direction as the original set of VPI/VCIs. For each call, ATM interworking multiplexers would be configured to invoke automatically this second VPI/VCI to provide a bidirectional virtual connection to match the bi-directional DS0 on the call.

In some embodiments, it may be desirable to incorporate digital signal processing capabilities at the DS0 level. For example, in the present invention, digital signal processing is used to detect the call trigger. It may also be desired to apply echo cancellation or encryption to selected DS0 circuits. In these embodiments, a signal processor 914 would be included either separately (as shown) or as a part of the DS0 interface 912. The signaling processor 922 would be configured to send control messages to the ATM interworking mux 902 to implement particular features on particular DS0 circuits.

FIG. 10 shows another embodiment of an ATM interworking multiplexer (mux) 1002 that is suitable for the present invention. The ATM interworking mux 1002 has a control interface 1004, an STM-N electrical/optical (E/O) interface 1006, an E3 interface 1008, an E1 interface 1010, an E0 interface 1012, a signal processor 1014, an ATM adaptation layer (AAL) 1016, an STM-M electrical/optical (E/O) interface 1018, and a digital private network signaling system (DPNSS) interface 1020.

The control interface 1004 accepts control messages from the signaling processor 1022. In particular, the control interface 1004 identifies E0 connections and virtual connection assignments in the control messages from the signaling processor 1022. These assignments are provided to the AAL 1016 for implementation.

The STM-N E/O interface 1006, the E3 interface 1008, the E1 interface 1010, the E0 interface 1012, and the DPNSS interface 1020 each can accept calls, including user communications, from a second communication device 1024. Likewise, the STM-M E/O interface 1018 can accept calls, including user communications, from a third communication device 1026.

The STM-N E/O interface 1006 accepts STM-N electrical or optical formatted communication signals and converts the communication signals from the STM-N electrical or STM-N optical format to the E3 format. The E3 interface 1008 accepts communication signals in the E3 format and converts the communication signals to the E1 format. The E3 interface 1008 can accept E3s from the STM-N E/O interface 1006 or from an external connection. The E1 interface 1010 accepts the communication signals in the E1 format and converts the communication signals to the E0 format. The E1 interface 1010 can accept E1s from the STM-N E/O interface 1006 or the E3 interface 1008 or from an external connection. The E0 interface 1012 accepts communication signals in the E0 format and provides an interface to the AAL 1016. The DPNSS interface 1020 accepts communication signals in the DPNSS format and converts the communication signals to the E0 format. In addition, each interface may transmit signals in a like manner to the communication device 1024.

The STM-M E/O interface 1018 is operational to accept ATM cells from the AAL 1016 and to transmit the ATM cells over the connection to the communication device 1026. The STM-M E/O interface 1018 may also accept ATM cells in the STM-M E/O format and transmit them to the AAL 1016.

The AAL 1016 comprises both a convergence sublayer and a segmentation and reassembly (SAR) sublayer. The AAL 1016 is operational to accept call origination device information in the E0 format from the E0 interface 1012 and to convert the call origination device information into ATM cells.

The AAL 1016 obtains from the control interface 1004 the virtual path identifier and the virtual channel identifier for each call connection. The AAL 1016 also obtains the identity of each call. The AAL 1016 then transfers the call origination device information between the identified E0 and the identified ATM virtual connection. An acknowledgment that the assignments have been implemented may be sent back to the signaling processor 1022 if desired. If desired, the AAL 1016 can be configured to accept control messages through the control interface 1004 for N×64 calls.

As discussed above, the ATM interworking mux 1002 also handles calls in the opposite direction, that is, in the direction from the STM-M E/O interface 1018 to the E0 interface 1012, including calls exiting from the E1 interface 1010, the E3 interface 1008, the STM-N E/O interface 1006, and the DPNSS interface 1020. For this traffic, the VPI/VCI has been selected already and the traffic has been routed through the cross-connect (not shown). As a result, the AAL 1016 only needs to identify the pre-assigned E0 for the selected VPI/VCI. This can be accomplished through a look-up table. In alternative embodiments, the signaling processor 1022 can provide this VPI/VCI assignment through the control interface 1004 to the AAL 1016.

E0 connections are bi-directional and ATM connections typically are uni-directional. As a result, two virtual connections in opposing directions typically will be required for each E0. Those skilled in the art will appreciate how this can be accomplished in the context of the invention. For example, the cross-connect can be provisioned with a second set of VPI/VCIs in the opposite direction as the original set of VPI/VCIs. For each call, ATM interworking multiplexers would be configured to automatically invoke this second VPI/VCI to provide a bi-directional virtual connection to match the bidirectional E0 on the call.

In some instances, it may be desirable to incorporate digital signal processing capabilities at the E0 level. For example, in the present invention, digital signal processing is used to detect the call trigger. Also, it may be desirable apply echo cancellation. In these embodiments, a signal processor 1014 would be included either separately (as shown) or as a part of the E0 interface 1012. The signaling processor 1022 would be configured to send control messages to the ATM interworking mux 1002 to implement particular features on particular circuits.

THE SIGNALING PROCESSOR

The signaling processor is referred to as a call/connection manager (CCM), and it receives and processes telecommunications call signaling and control messages to select connections that establish communication paths for calls. In the preferred embodiment, the CCM processes SS7 signaling to select connections for a call. CCM processing is described in a U.S. patent application having attorney docket number 1148, which is entitled "Telecommunication System," which is assigned to the same assignee as this patent application, and which is incorporated herein by reference.

In addition to selecting connections, the CCM performs many other functions in the context of call processing. It not only can control routing and select the actual connections, but it can also validate callers, control echo cancelers, generate billing information, invoke intelligent network functions, access remote databases, manage traffic, and balance network loads. One skilled in the art will appreciate how the CCM described below can be adapted to operate in the above embodiments.

Figure 11:
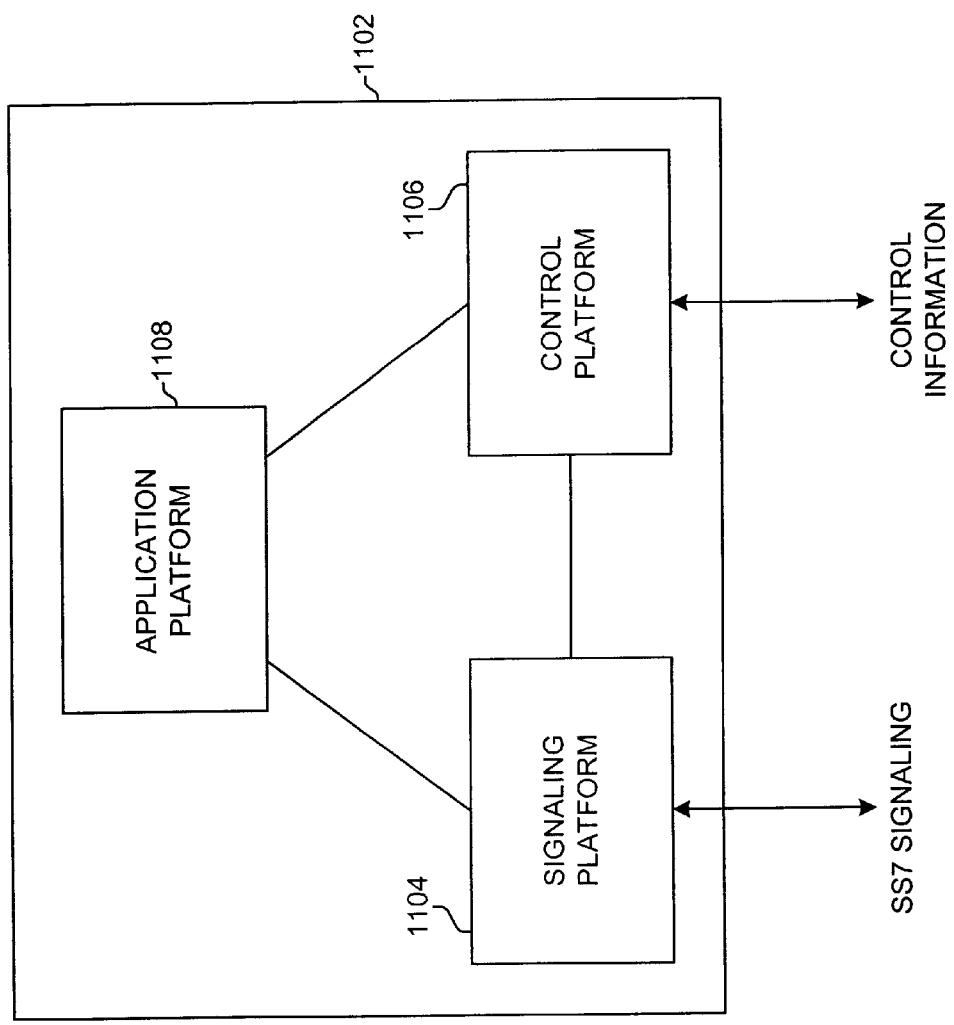
FIG. 11 is a block diagram of a signaling processor constructed in accordance with the present system.

FIG. 11 depicts a version of the CCM. Other versions are also contemplated. In the embodiment of FIG. 11, the CCM 1102 controls an ATM interworking multiplexer (mux) that performs interworking of DS0s and VPI/VCIs. However, the CCM may control other communications devices and connections in other embodiments.

The CCM 1102 comprises a signaling platform 1104, a control platform 1106, and an application platform 1108. Each of the platforms 1104, 1106, and 1108 is coupled to the other platforms.

The signaling platform 1104 is externally coupled to the SS7 systems—in particular to systems having a message transfer part (MTP), an ISDN user part (ISUP), a signaling connection control part (SCCP), an intelligent network application part (INAP), and a transaction capabilities application part (TCAP). The control platform 1106 is externally coupled to a mux control, an echo control, a resource control, billing, and operations.

The signaling platform 1104 comprises MTP levels 1–3, ISUP, TCAP, SCCP, and INAP functionality and is operational to transmit and receive the SS7 messages. The ISUP, SCCP, INAP, and TCAP functionality use MTP to transmit and receive the SS7 messages. Together, this functionality is referred as an "SS7 stack," and it is well known. The software required by one skilled in the art to configure an SS7 stack is commercially available, for example, from the Trillium company.

The control platform 1106 is comprised of various external interfaces including a mux interface, an echo interface, a resource control interface, a billing interface, and an operations interface. The mux interface exchanges messages with at least one mux. These messages comprise DS0 to VPI/VCI assignments, acknowledgments, and status information. The echo control interface exchanges messages with echo control systems. Messages exchanged with echo control systems might include instructions to enable or disable echo cancellation on particular DS0s, acknowledgments, and status information.

The resource control interface exchanges messages with external resources. Examples of such resources are devices that implement continuity testing, encryption, compression, tone detection/transmission, voice detection, and voice messaging. The messages exchanged with resources are instructions to apply the resource to particular DS0s, acknowledgments, and status information. For example, a message may instruct a continuity testing resource to provide a loopback or to send and detect a tone for a continuity test.

The billing interface transfers pertinent billing information to a billing system. Typical billing information includes the parties to the call, time points for the call, and any special features applied to the call. The operations interface allows for the configuration and control of the CCM 1102. One skilled in the art will appreciate how to produce the software for the interfaces in the control platform 1106.

The application platform 1108 is functional to process signaling information from the signaling platform 1104 in order to select connections. The identity of the selected connections are provided to the control platform 1106 for the mux interface. The application platform 1108 is responsible for validation, translation, routing, call control, exceptions, screening, and error handling. In addition to providing the control requirements for the mux, the application platform 1108 also provides requirements for echo control and resource control to the appropriate interface of the control platform 1106. In addition, the application platform 1108 generates signaling information for transmission by the signaling platform 1104. The signaling information might be ISUP, INAP, or TCAP messages to external network elements. Pertinent information for each call is stored in a call control block (CCB) for the call. The CCB can be used for tracking and billing the call.

The application platform 1108 operates in general accord with the Basic Call Model (BCM) defined by the ITU. An instance of the BCM is created to handle each call. The BCM includes an originating process and a terminating process. The application platform 1108 includes a service switching function (SSF) that is used to invoke the service control function (SCF). Typically, the SCF is contained in a service control point (SCP). The SCF is queried with TCAP or INAP messages. The originating or terminating processes will access remote databases with intelligent network (IN) functionality via the SSF function.

Software requirements for the application platform 1108 can be produced in specification and description language (SDL) defined in ITU-T Z.100. The SDL can be converted into C code. Additional C and C++ code can be added as required to establish the environment.

The CCM 1102 can be comprised of the above-described software loaded onto a computer. The computer can be an Integrated Micro Products (IMP) FT-Sparc 600 using the Solaris operating system and conventional database systems. It may be desirable to utilize the multi-threading capability of a Unix operating system.

From FIG. 11, it can be seen that the application platform 1108 processes signaling information to control numerous systems and facilitate call connections and services. The SS7 signaling is exchanged with external components through the signaling platform 1104, and control information is exchanged with external systems through the control platform 1106. Advantageously, the CCM 1102 is not integrated into a switch CPU that is coupled to a switching matrix. Unlike an SCP, the CCM 1102 is capable of processing ISUP messages independently of TCAP queries.

SS7 MESSAGE DESIGNATIONS

SS7 messages are well known. Designations for various SS7 messages commonly are used. Those skilled in the art are familiar with the following message designations:
ACM—Address Complete Message
ANM—Answer Message
BLO—Blocking
BLA—Blocking Acknowledgment
CPG—Call Progress
CRG—Charge Information
CGB—Circuit Group Blocking
CGBA—Circuit Group Blocking Acknowledgment
GRS—Circuit Group Reset
GRA—Circuit Group Reset Acknowledgment
CGU—Circuit Group Unblocking
CGUA—Circuit Group Unblocking Acknowledgment
CQM—Circuit Group Query
CQR—Circuit Group Query Response
CRM—Circuit Reservation Message
CRA—Circuit Reservation Acknowledgment
CVT—Circuit Validation Test
CVR—Circuit Validation Response
CFN—Confusion
COT—Continuity
CCR—Continuity Check Request
EXM—Exit Message
INF—Information
INR—Information Request
IAM—Initial Address
LPA—Loop Back Acknowledgment
PAM—Pass Along
REL—Release
RLC—Release Complete
RSC—Reset Circuit
RES—Resume
SUS—Suspend
UBL—Unblocking
UBA—Unblocking Acknowledgment
UCIC—Unequipped Circuit Identification Code.

CCM TABLES

Call processing typically entails two aspects. First, an incoming or "originating" connection is recognized by an originating call process. For example, the initial connection that a call uses to enter a network is the originating connection in that network. Second, an outgoing or "terminating" connection is selected by a terminating call process. For example, the terminating connection is coupled to the originating connection in order to extend the call through the network. These two aspects of call processing are referred to as the originating side of the call and the terminating side of the call.

Figure 12:
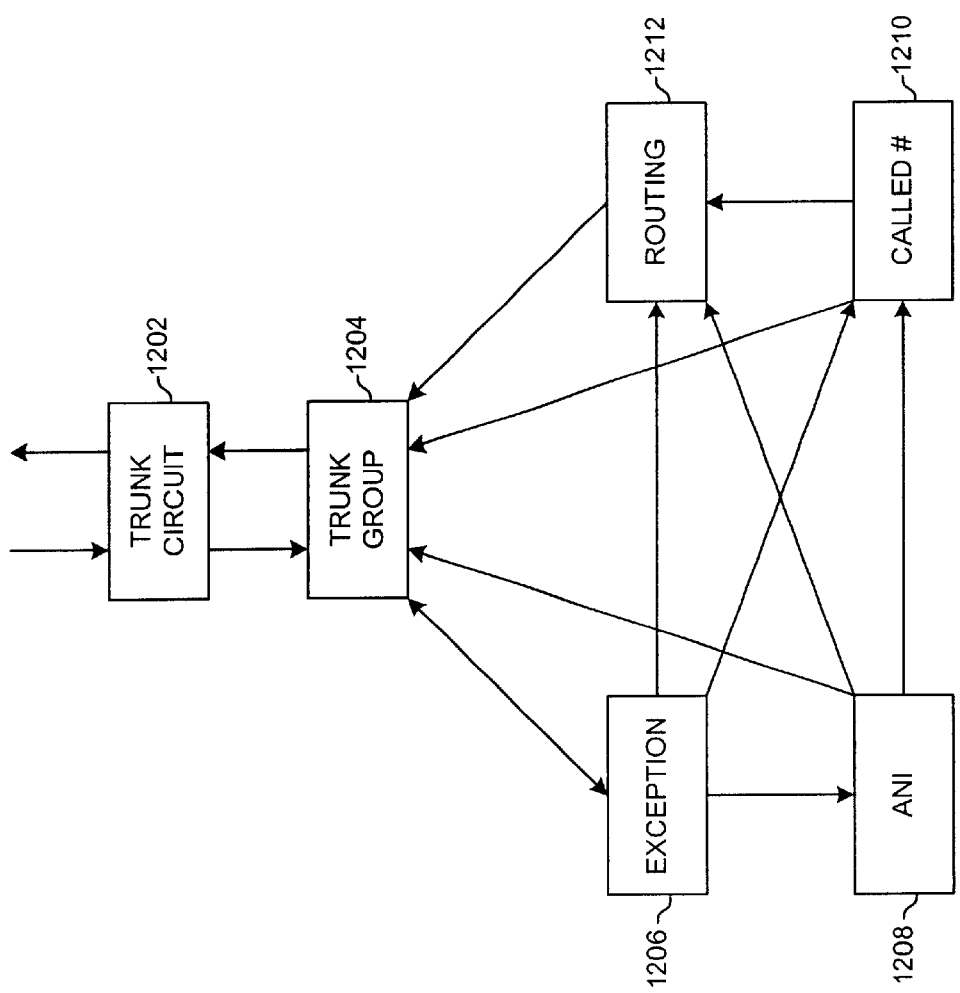
FIG. 12 is a block diagram of a data structure having tables that are used in the signaling processor of FIG. 11.

FIG. 12 depicts a data structure used by the application platform 1108 to execute the BCM. This is accomplished through a series of tables that point to one another in various ways. The pointers are typically comprised of next function and next index designations. The next function points to the next table, and the next index points to an entry or a range of entries in that table. The data structure has a trunk circuit table 1202, a trunk group table 1204, an exception table 1206, an ANI table 1208, a called number table 1210, and a routing table 1212.

The trunk circuit table 1202 contains information related to the connections. Typically, the connections are DS0 or ATM connections. Initially, the trunk circuit table 1202 is used to retrieve information about the originating connection. Later, the table is used to retrieve information about the terminating connection. When the originating connection is being processed, the trunk group number in the trunk circuit table 1202 points to the applicable trunk group for the originating connection in the trunk group table 1204.

The trunk group table 1204 contains information related to the originating and terminating trunk groups. When the originating connection is being processed, the trunk group table 1204 provides information relevant to the trunk group for the originating connection and typically points to the exception table 1206.

The exception table 1206 is used to identify various exception conditions related to the call that may influence the routing or other handling of the call. Typically, the exception table 1206 points to the ANI table 1208. Although, the exception table 1206 may point directly to the trunk group table 1204, the called number table 1210, or the routing table 1212.

The ANI table 1208 is used to identify any special characteristics related to the caller's number. The caller's number is commonly known as automatic number identification (ANI). The ANI table 1208 typically points to the called number table 1210. Although, the ANI table 1208 may point directly to the trunk group table 1204 or the routing table 1212.

The called number table 1210 is used to identify routing requirements based on the called number. This will be the case for standard telephone calls. The called number table 1210 typically points to the routing table 1212. Although, it may point to the trunk group table 1204.

The routing table 1212 has information relating to the routing of the call for the various connections. The routing table 1212 is entered from a pointer in either the exception table 1206, the ANI table 1208, or the called number table 1210. The routing table 1212 typically points to a trunk group in the trunk group table 1204.

When the exception table 1206, the ANI table 1208, the called number table 1210, or the routing table 1212 point to the trunk group table 1204, they effectively select the terminating trunk group. When the terminating connection is being processed, the trunk group number in the trunk group table 1204 points to the trunk group that contains the applicable terminating connection in the trunk circuit table 1204.

The terminating trunk circuit is used to extend the call. The trunk circuit is typically a VPI/VCI or a DS0. Thus it can be seen that by migrating through the tables, a terminating connection can be selected for a call.

Figure 13:
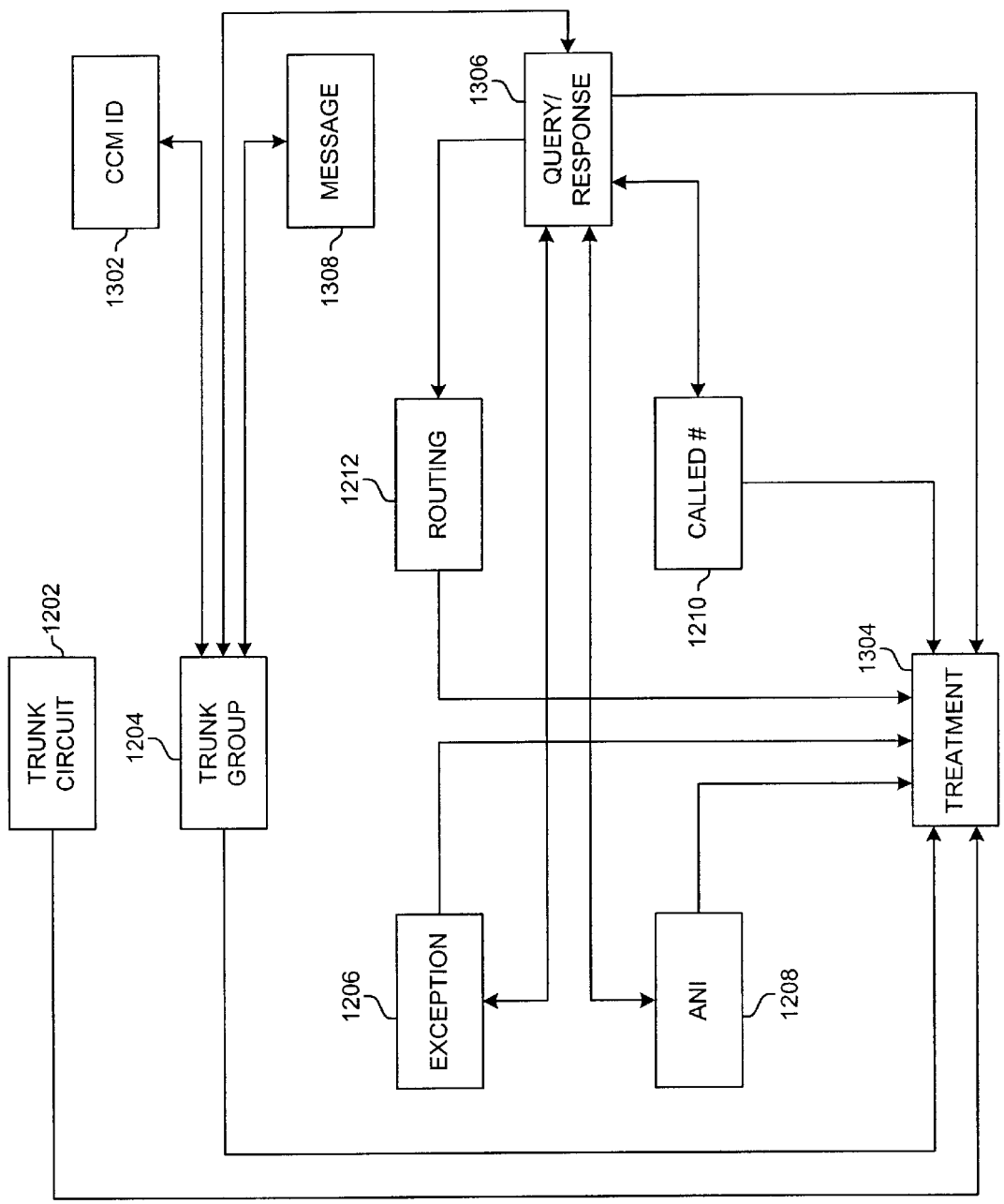
FIG. 13 is a block diagram of additional tables that are used in the signaling processor of FIG. 12.

FIG. 13 is an overlay of FIG. 12. The tables from FIG. 12 are present, but for clarity, their pointers have been omitted. FIG. 13 illustrates additional tables that can be accessed from the tables of FIG. 12. These include a CCM ID table 1302, a treatment table 1304, a query/response table 1306, and a message table 1308.

The CCM ID table 1302 contains various CCM SS7 point codes. It can be accessed from the trunk group table 1204, and it points back to the trunk group table 1204.

The treatment table 1304 identifies various special actions to be taken in the course of call processing. This will typically result in the transmission of a release message (REL) and a cause value. The treatment table 1304 can be accessed from the trunk circuit table 1202, the trunk group table 1204, the exception table 1206, the ANI table 1208, the called number table 1210, the routing table 1212, and the query/response table 1306.

The query/response table 1306 has information used to invoke the SCF. It can be accessed by the trunk group table 1204, the exception table 1206, the ANI table 1208, the called number table 1210, and the routing table 1212. It points to the trunk group table 1204, the exception table 1206, the ANI table 1208, the called number table 1210, the routing table 1212, and the treatment table 1304.

The message table 1308 is used to provide instructions for messages from the termination side of the call. It can be accessed by the trunk group table 1204 and points to the trunk group table 1204.

FIGS. 14–21 depict examples of the various tables described above. FIG. 14 depicts an example of the trunk circuit table. Initially, the trunk circuit table is used to access information about the originating circuit. Later in the processing, it is used to provide information about the terminating circuit. For originating circuit processing, the associated point code is used to enter the table. This is the point code of the switch or CCM associated with the originating circuit. For terminating circuit processing, the trunk group number is used to enter the table.

The table also contains the circuit identification code (CIC). The CIC identifies the circuit which is typically a DS0 or a VPI/VCI. Thus, the invention is capable of mapping the SS7 CICs to the ATM VPI/VCI. If the circuit is ATM, the virtual path (VP) and the virtual channel (VC) also can be used for identification. The group member number is a numeric code that is used for terminating circuit selection. The hardware identifier identifies the location of the hardware associated with the originating circuit. The echo canceler (EC) identification (ID) entry identifies the echo canceler for the originating circuit.

The remaining fields are dynamic in that they are filled during call processing. The echo control entry is filled based on three fields in signaling messages: the echo suppresser indicator in the IAM or CRM, the echo control device indicator in the ACM or CPM, and the information transfer capability in the IAM. This information is used to determine if echo control is required on the call. The satellite indicator is filled with the satellite indicator in the IAM or CRM. It may be used to reject a call if too many satellites are used. The circuit status indicates if the given circuit is idle, blocked, or not blocked. The circuit state indicates the current state of the circuit, for example, active or transient. The time/date indicates when the idle circuit went idle.

FIG. 15 depicts an example of the trunk group table. During origination processing, the trunk group number from the trunk circuit table is used to key into the trunk table. Glare resolution indicates how a glare situation is to be resolved. Glare is dual seizure of the same circuit. If the glare resolution entry is set to "even/odd," the network element with the higher point code controls the even circuits, and the network element with the lower point code controls the odd circuits. If the glare resolution entry is set to "all," the CCM controls all of the circuits. If the glare resolution entry is set to "none," the CCM yields. The continuity control entry lists the percent of calls requiring continuity tests on the trunk group.

The common language location identifier (CLLI) entry is a Bellcore standardized entry. The satellite trunk group entry indicates that the trunk group uses a satellite. The satellite trunk group entry is used in conjunction with the satellite indicator field described above to determine if the call has used too many satellite connections and, therefore, must be rejected. The service indicator indicates if the incoming message is from a CCM (ATM) or a switch (TDM). The outgoing message index (OMI) points to the message table so that outgoing messages can obtain parameters. The associated number plan area (NPA) entry identifies the area code.

Selection sequence indicates the methodology that will be used to select a connection. The selection sequence field designations tell the trunk group to select circuits based on the following: least idle, most idle, ascending, descending, clockwise, and counterclockwise. The hop counter is decremented from the IAM. If the hop counter is zero, the call is released. Automatic congestion control (ACC) active indicates whether or not congestion control is active. If automatic congestion control is active, the CCM may release the call. During termination processing, the next function and index are used to enter the trunk circuit table.

FIG. 16 depicts an example of the exception table. The index is used as a pointer to enter the table. The carrier selection identification (ID) parameter indicates how the caller reached the network and is used for routing certain types of calls. The following are used for this field: spare or no indication, selected carrier identification code presubscribed and input by the calling party, selected carrier identification code presubscribed and not input by the calling party, selected carrier identification code presubscribed and no indication of input by the calling party, and selected carrier identification code not presubscribed and input by the calling party. The carrier identification (ID) indicates the network that the caller wants to use. This is used to route calls directly to the desired network. The called party number nature of address differentiates between 0+ calls, 1+ calls, test calls, and international calls. For example, international calls might be routed to a pre-selected international carrier.

The called party "digits from" and "digits to" focus further processing unique to a defined range of called numbers. The "digits from" field is a decimal number ranging from 1–15 digits. It can be any length and, if filled with less than 15 digits, is filled with 0s for the remaining digits. The "digits to" field is a decimal number ranging from 1–15 digits. It can be any length and, if filled with less than 15 digits, is filled with 9s for the remaining digits. The next function and next index entries point to the next table which is typically the ANI table.

FIG. 17 depicts an example of the ANI table. The index is used to enter the fields of the table. The calling party category differentiates among types of calling parties, for example, test calls, emergency calls, and ordinary calls. The calling party\charge number entry nature of address indicates how the ANI is to be obtained. The following is the table fill that is used in this field: unknown, unique subscriber numbers, ANI not available or not provided, unique national number, ANI of the called party included, ANI of the called party not included, ANI of the called party includes national number, non-unique subscriber number, non-unique national number, non-unique international number, test line test code, and all other parameter values.

The "digits from" and "digits to" focus further processing unique to ANI within a given range. The data entry indicates if the ANI represents a data device that does not need echo control. Originating line information (OLI) differentiates among ordinary subscriber, multiparty line, ANI failure, station level rating, special operator handling, automatic identified outward dialing, coin or non-coin call using database access, 800\888 service call, coin, prison/inmate service, intercept (blank, trouble, and regular), operator handled call, outward wide area telecommunications service, telecommunications relay service (TRS), cellular services, private paystation, and access for private virtual network types of service. The next function and next index point to the next table which is typically the called number table.

FIG. 18 depicts an example of the called number table. The index is used to enter the table. The called number nature of address entry indicates the type of dialed number, for example, national versus international. The "digits from" and "digits to" entries focus further processing unique to a range of called numbers. The processing follows the processing logic of the "digits from" and "digits to" fields in FIG. 16. The next function and next index point to the next table which is typically the routing table.

FIG. 19 depicts an example of the routing table. The index is used to enter the table. The transit network selection (TNS) network identification (ID) plan indicates the number of digits to use for the CIC. The transit network selection "digits from" and "digits to" fields define the range of numbers to identify an international carrier. The circuit code indicates the need for an operator on the call. The next function and next index entries in the routing table are used to identify a trunk group. The second and third next function/index entries define alternate routes. The third next function entry can also point back to another set of next functions in the routing table in order to expand the number of alternate route choices. The only other entries allowed are pointers to the treatment table. If the routing table points to the trunk group table, then the trunk group table typically points to a trunk circuit in the trunk circuit table. The yield from the trunk circuit table is the terminating connection for the call.

It can be seen from FIGS. 14–19 that the tables can be configured and relate to one another in such a way that call processes can enter the trunk circuit table for the originating connection and can traverse through the tables by keying on information and using pointers. The yield of the tables is typically a terminating connection identified by the trunk circuit table. In some cases, treatment is specified by the treatment table instead of a connection. If, at any point during the processing, a trunk group can be selected, processing may proceed directly to the trunk group table for terminating circuit selection. For example, it may be desirable to route calls from a particular ANI over a particular set of trunk groups. In this case, the ANI table would point directly to the trunk group table, and the trunk group table would point to the trunk circuit table for a terminating circuit. The default path through the tables is: trunk circuit, trunk group, exception, ANI, called number, routing, trunk group, and trunk circuit.

FIG. 20 depicts an example of the treatment table. Either the index or the message received cause number are filled and are used to enter the table. If the index is filled and used to enter the table, the general location, coding standard, and cause value indicator are used to generate an SS7 REL. The message received cause value entry is the cause value in a received SS7 message. If the message received cause value is filled and used to enter the table, then the cause value from that message is used in a REL from the CCM. The next function and next index point to the next table.

FIG. 21 depicts an example of the message table. This table allows the CCM to alter information in outgoing messages. Message type is used to enter the table, and it represents the outgoing standard SS7 message type. The parameter is the pertinent parameter within the outgoing SS7 message. The indexes point to various entries in the trunk group table and determine if parameters can be unchanged, omitted, or modified in the outgoing messages.

Those skilled in the art will appreciate that variations from the specific embodiments disclosed above are contemplated by the invention. The invention should not be restricted to the above embodiments, but should be measured by the following claims.

What is claimed is:

1. A method for operating a communication network comprised of a first service platform and a second service platform, wherein the first service platform is comprised of a first processor, a first interworking unit, and a first service node, and wherein the second service platform is comprised of a second processor, a second interworking unit, and a second service node, the method comprising:

receiving a first set of information into the first processor wherein the first set of information is related to a first user communication in a first communication format;

in the first processor, selecting a first service and the first service node to provide the first service based on the first set of information;

in the first processor, generating and transmitting a first message and a second message;

receiving the first user communication in the first communication format and the first message into the first interworking unit;

in the first interworking unit, converting the first user communication from the first communication format to a second communication format and transmitting the first user communication in the second communication format to the first service node in response to the first message;

receiving the first user communication in the second communication format and the second message into the first service node;

in the first service node, providing the first service in response to the second message;

receiving a second set of information into the first processor wherein the second set of information is related to a second user communication and wherein the second user communication is in the first communication format;

in the first processor, selecting a second service and the second service node to provide the second service based on the second set of information;

in the first processor, generating and transmitting a third message and a fourth message;

receiving the third message into the first interworking unit;

in the first interworking unit, transferring the second user communication in the first format to the second interworking unit in response to the third message;

receiving the fourth message into a second processor;

in the second processor, generating and transmitting a fifth message and a sixth message in response to the fourth message;

receiving the second user communication in the first communication format and the fifth message into the second interworking unit;

in the second interworking unit, converting the second user communication from the first communication format to the second communication format and transmitting the second user communication in the second communication format to the second service node in response to the fifth message;

receiving the second user communication in the second communication format and the sixth message into the second service node; and in the second service node, providing the second service in response to the sixth message.

2. The method of claim 1 wherein the first set of information and the second set of information are telecommunication signaling messages.

3. The method of claim 1 wherein the first set of information and the second set of information are Signaling System #7 messages.

4. The method of claim 1 wherein the first set of information and the second set of information are Signaling System #7 Initial Address Messages (IAMs).

5. The method of claim 1 wherein the first set of information and the second set of information are internet messages.

6. The method of claim 1 wherein the first set of information and the second set of information are ethernet messages.

7. The method of claim 1 wherein the first communication format is a time division multiplex communication format.

8. The method of claim 1 wherein the first communication format is an asynchronous transfer mode communication format.

9. The method of claim 1 wherein the first communication format is a connectionless communication format.

10. The method of claim 1 wherein the second communication format is a time division multiplex communication format.

11. The method of claim 1 wherein the second communication format is an asynchronous transfer mode communication format.

12. The method of claim 1 wherein the second communication format is a connectionless communication format.

13. The method of claim 1 wherein the first service includes voice message processing.

14. The method of claim 1 wherein the first service includes facsimile call processing.

15. The method of claim 1 wherein the first service includes voice recognition processing.

16. The method of claim 1 wherein the first service includes conference call processing.

17. The method of claim 1 wherein the first service includes calling card call processing.

18. The method of claim 1 wherein the first service includes toll free call processing.

19. The method of claim 1 wherein the first service includes menu routing call processing.

20. The method of claim 1 wherein the first service includes tone detection processing.

21. The method of claim 1 wherein the second service includes voice message processing.

22. The method of claim 1 wherein the second service includes facsimile call processing.

23. The method of claim 1 wherein the second service includes voice recognition processing.

24. The method of claim 1 wherein the second service includes conference call processing.

25. The method of claim 1 wherein the second service includes calling card call processing.

26. The method of claim 1 wherein the second service includes toll free call processing.

27. The method of claim 1 wherein the second service includes menu routing call processing.

28. The method of claim 1 wherein the second service includes tone detection processing.

29. The method of claim 1 wherein selecting the second service comprises:

generating and transmitting a query from the first processor to a database;

receiving a response into the first processor from the data base; and processing the response in the first processor.

30. The method of claim 1 further comprising:

in the first service node, generating and transmitting a seventh message indicating that the first service has been provided;

receiving the seventh message into the first processor;

in the first processor, selecting a third service and the second service node to provide the third service in response to the seventh message;

in the first processor, generating and transmitting an eighth message and a ninth message;

receiving the eighth message into the first interworking unit;

in the first interworking unit, transferring the first user communication in the first format to the second interworking unit in response to the eighth message;

receiving the ninth message into the second processor;

in the second processor, generating and transmitting a tenth message and an eleventh message in response to the ninth message;

receiving the first user communication in the first communication format and the tenth message into the second interworking unit;

in the second interworking unit, converting the first user communication from the first communication format to the second communication format and transmitting the first user communication in the second communication format to the second service node in response to the tenth message;

receiving the first user communication in the second communication format and the eleventh message into the second service node; and in the second service node, providing the third service in response to the eleventh message.

* * * * *